United States Patent
Wada et al.

[11] Patent Number: 5,801,472
[45] Date of Patent: Sep. 1, 1998

[54] MICRO-FABRICATED DEVICE WITH INTEGRATED ELECTROSTATIC ACTUATOR

[75] Inventors: Yasuo Wada, Tokyo; Munehisa Mitsuya, Sakado; Tsuneo Ichiguchi, Hatoyama-Machi; Tomihiro Hashizume, Hatoyama-Machi; Seiji Heike, Hatoyama-Machi; Mark Lutwyche, Higashi-Matsuyama; Satoshi Watanabe, Wako, all of Japan

[73] Assignee: Hitchi, Ltd., Tokyo, Japan

[21] Appl. No.: 696,089

[22] Filed: Aug. 13, 1996

[30] Foreign Application Priority Data

Aug. 18, 1995 [JP] Japan ................ 7-210406
Dec. 18, 1995 [JP] Japan ................ 7-328707
Apr. 12, 1996 [JP] Japan ................ 8-090778

[51] Int. Cl.$^6$ ............... H02N 1/00; G01N 23/00
[52] U.S. Cl. .......................... 310/309; 250/309
[58] Field of Search ...................... 310/308, 309; 250/306, 310, 311, 309

[56] References Cited

U.S. PATENT DOCUMENTS

| | | | |
|---|---|---|---|
| 5,055,731 | 10/1991 | Nihei et al. | 310/309 |
| 5,235,187 | 8/1993 | Arney et al. | 250/306 |
| 5,396,066 | 3/1995 | Ikeda et al. | 250/306 |
| 5,428,259 | 6/1995 | Suzuki | 310/309 |
| 5,431,055 | 7/1995 | Takata et al. | 250/307 |
| 5,536,988 | 7/1996 | Zhang et al. | 310/309 |
| 5,576,483 | 11/1996 | Bonin | 361/283.2 |
| 5,631,514 | 5/1997 | Garcia et al. | 310/309 |

OTHER PUBLICATIONS

"Atomic and Molecular Manipulation with the Scanning Tunneling Microscope" by Joseph A. Stroxcio, et al, pp. 1319–1326 (1991).

"Surface Studies by Scanning Tunneling Microscopy" by G. Binning, et al pp. 57–61 (1982).

"Fabrication of 0.1 pm metal oxide semiconductor field–effect transistors with the atomic force microscope" by S.C. Minne, et al pp. 703–705 (1995).

*Primary Examiner*—Clayton E. LaBalle
*Attorney, Agent, or Firm*—Antonelli, Terry, Stout & Kraus, LLP

[57] ABSTRACT

A device according to the present invention is a miniaturized efficient device wherein electromechanical transduction is enabled and which is provided with at least an integrated electrostatic actuator provide with an actuator in which a fixed portion and a movable portion are opposite, a plurality of which are arranged and the relative amount of movement of which is controlled by controlling electrostatic force operating between both, the movable portion moved by the integrated electrostatic actuator and a portion connected to the movable portion which can be operated mechanically. The probe of a scanning probe microscope is provided to the movable portion of the above actuator. The above transducer is provided with the structure in which a large number of such actuators are arranged two- or one-dimensionally.

32 Claims, 17 Drawing Sheets

FIG. 16(a)
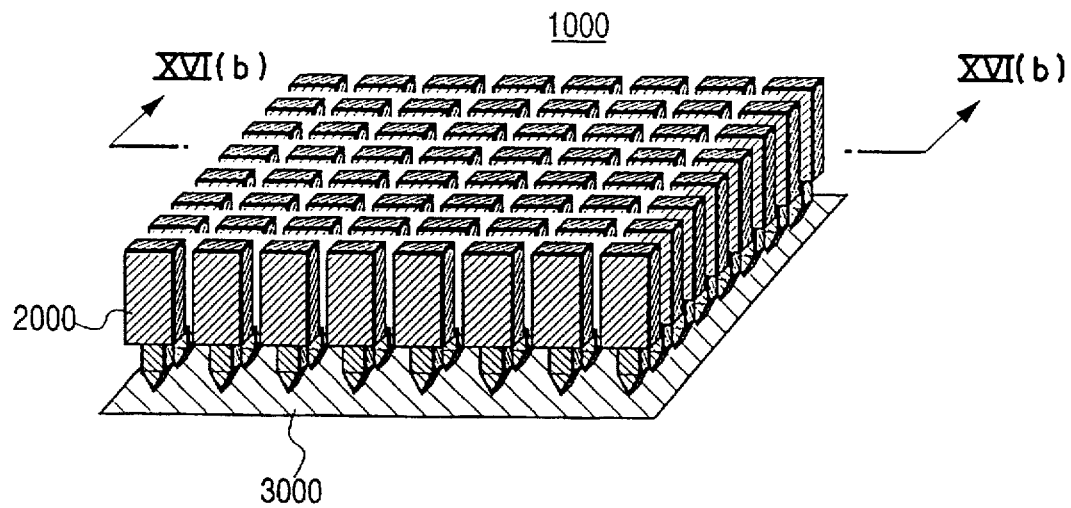
FIG. 16(b)
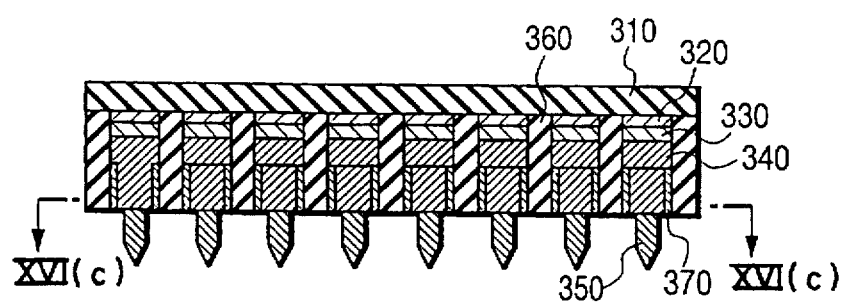
FIG. 16(c)
FIG. 16(d)
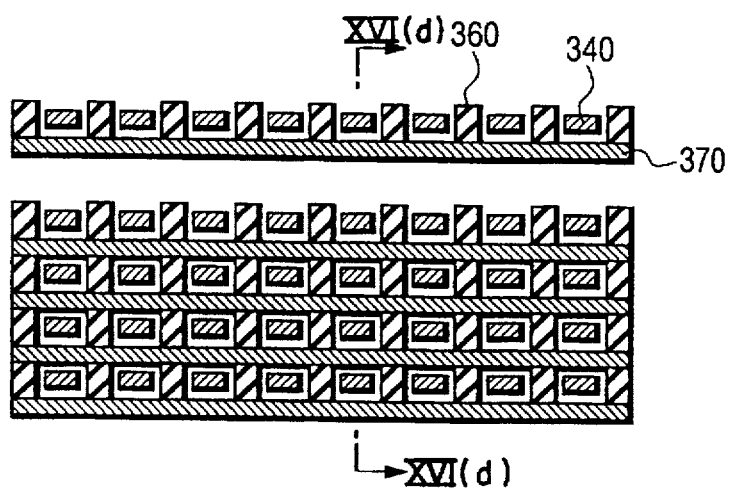
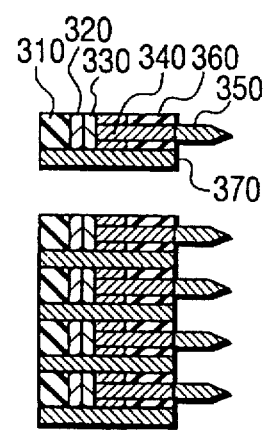

FIG. 22(a)
FIG. 22(b)
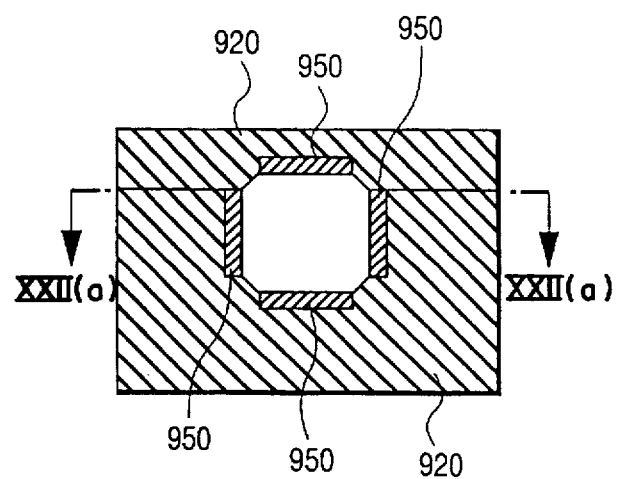
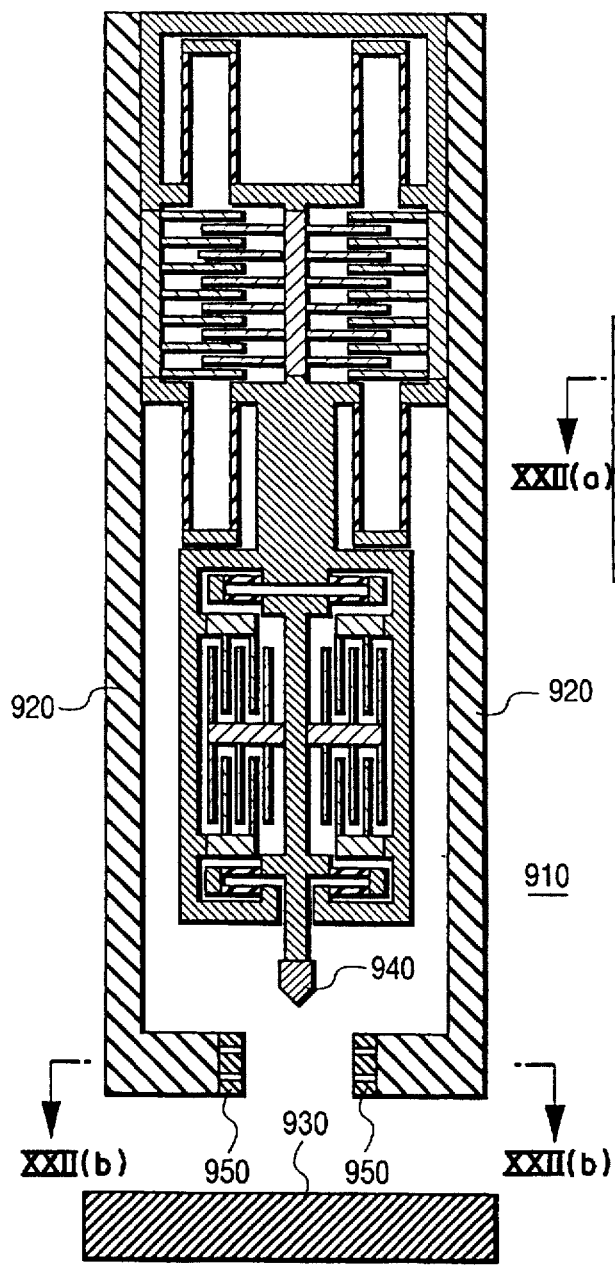

FIG. 23(a)
FIG. 23(b)
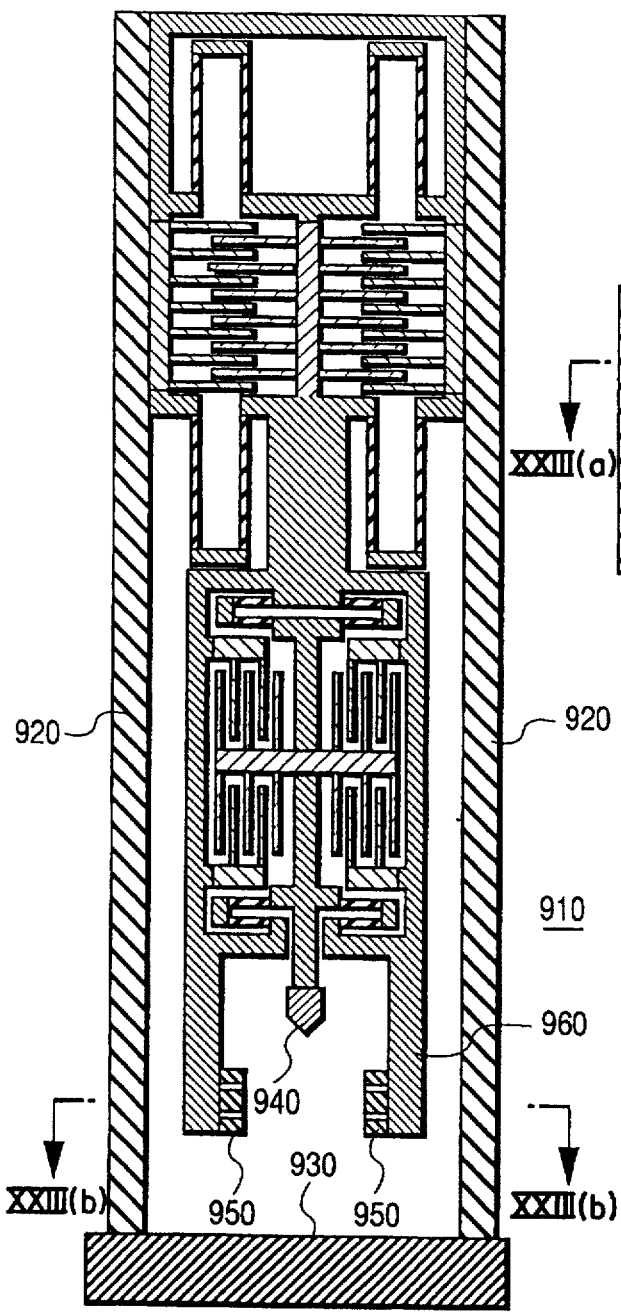
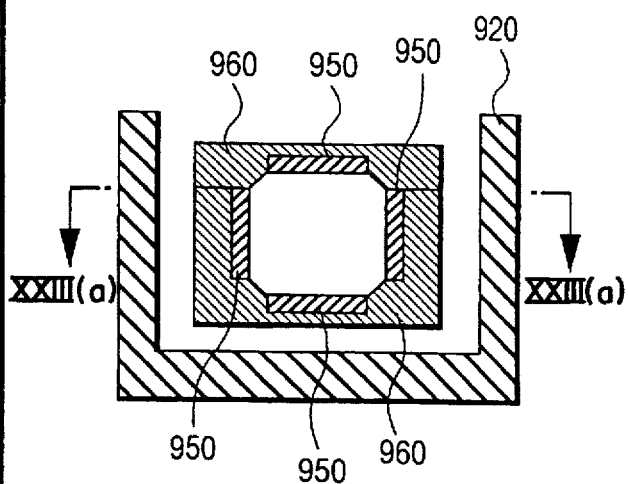

MICRO-FABRICATED DEVICE WITH INTEGRATED ELECTROSTATIC ACTUATOR

BACKGROUND OF THE INVENTION

The present invention relates to a micro-fabricated device fabricated by micro-fabrication technology, in detail relates to an electromechanical transducer for transducing an electric signal to mechanical operation or conversely mechanical operation to an electric signal by an electrostatic actuator, a surface observing apparatus or a record and reproduction device and further relates to an electron beam source.

The conventional electromechanical transducer transduces the change of current which flows in an electromagnet to mechanical operation or conversely mechanical operation to the change of current as a microphone or a speaker. Also, as for a surface observing apparatus with high resolution, a scanning probe microscope which is provided with high spatial resolution utilizing the principle of a near field such as an optical microscope, a scanning tunneling microscope and an interatomic force microscope is developed and widely used.

The resolution of this scanning probe microscope is generally approximately 20 to 0.1 nm in the direction parallel to the surface of a sample and approximately 1 to 0.01 nm in the direction perpendicular to the surface thereof. However, as the distance between a probe and a sample is required to be controlled using a servo mechanism so that it is approximately 20 to 0.5 nm in a scanning probe microscope with high resolution, the scanning speed cannot be set to 10 μm/sec. or more. Also, as a voltage-mechanical deformation conversion device such as a piezoelectric device is used for the scanning mechanism of a normal scanning probe microscope, the range of scanning does not exceed one hundredth of the size of the above device.

As for a storage device, it is tried to develop the above probe microscope so that it i s a record and reproduction device, however, satisfactory results are not obtained. As for an electron beam source, an example of microminiaturization shown in the present invention is not known.

SUMMARY OF THE INVENTION

However, a conventional system using such an electromagnet has a problem that the efficiency of converting electric or mechanical energy is low and its dynamic range is also small. Further, in the conventional conversion system, as its dimension is limited by the size of an electromagnet, microminiaturization is impossible. These are caused by using an electromagnet around which a large number of electric wires are wound. The reason why the scanning area of the scanning mechanism of a normal scanning probe microscope is small is that the voltage-mechanical deformation conversion device of a piezoelectric device and others is used as driving force.

The present invention is made to solve such problems of the prior art and the object is to enable conversion with high conversion efficiency and a large dynamic range by an electromechanical transducing system driven by an integrated electrostatic actuator fabricated by micro-fabrication technology using by semiconductor manufacturing technology. That is, the object is to provide a microminiaturized system for transducing an electric signal sent by an integrated electrostatic actuator to mechanical operation or a microminiaturized system for transducing mechanical operation to an electric signal conversely. Further, the object is to provide a system which is provided with a much larger scanning area per unit time without reducing resolution, compared with that of a prior system by constituting the above-described system as an integrated micro-fabricated device with high resolution using an integrated electrostatic actuator as a driving source.

Further, the object of the present invention is to provide an integrated micro-fabricated device wherein the scanning area of each element of the integrated micro-fabricated device using an integrated electrostatic actuator as a driving source reaches approximately one third of the size of the body of the element.

Furthermore, the object of the present invention is to provide an integrated electromechanical transducer formed by arranging a plurality of scanning probe microscopes, record and reproduction devices or electron beam sources using an integrated electrostatic actuator as a driving source on one substrate which are arranged one- or two-dimensionally.

BRIEF DESCRIPTION OF THE DRAWINGS

FIGS. 16(a) to (d) show an embodiment of an integrated surface observing apparatus wherein the surface observing apparatus provided with the integrated electrostatic actuator shown in FIG. 15 is two-dimensionally arrayed;

FIG. 22 is a schematic drawing showing an embodiment in which the constitution of a surface observing apparatus is applied to an electron beam source, FIG. 22(a) is a plan viewed along a line C–D in FIG. 22(b) and FIG. 22(b) is a sectional view viewed along a line A–B in FIG. 22(a);

FIG. 23 is a schematic drawing showing another embodiment in which the constitution of a surface observing apparatus is applied to an electron beam source, FIG. 23(a) is a plan viewed along a line C–D in FIG. 23(b) and FIG. 23(b) is a sectional view viewed along a line A–B in FIG. 23(a);

FIG. 24 is a schematic drawing showing an embodiment in which the constitution of a surface observing apparatus is applied to another type of electron beam source, FIG. 25 is a schematic drawing showing another embodiment in which the constitution of a surface observing apparatus is applied to another type of electron beam source.

DESCRIPTION OF THE PREFERRED EMBODIMENT

Figure 1:
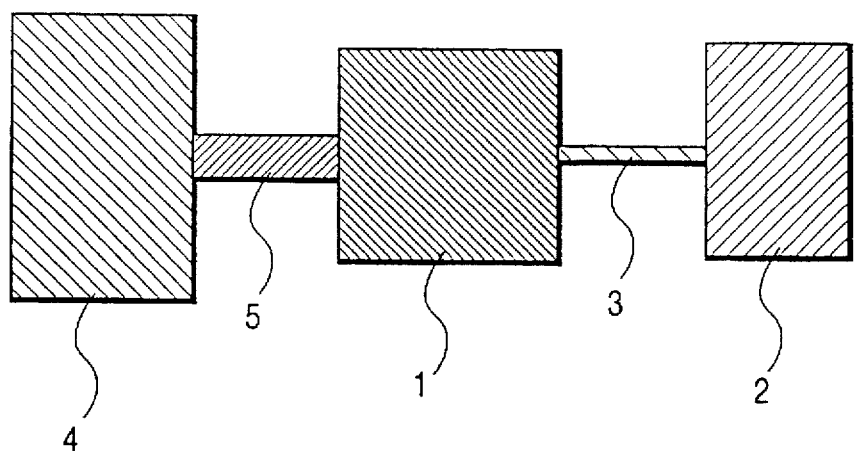
FIG. 1 is a block diagram showing an embodiment of an electromechanical transducing system by an integrated electrostatic actuator fabricated by micro-fabrication technology according to the present invention.

FIG. 1 is a block diagram showing an electromechanical transducing system by an integrated electrostatic actuator fabricated by micro-fabrication technology according to the present invention. A reference number 1 denotes an integrated electrostatic actuator and a reference number 2 denotes a power source and a control unit. The integrated electrostatic actuator 1 and the power source and control unit 2 are connected by a connection 3 for supplying a signal and power. A reference number 4 denotes a movable device, which is mechanically coupled by the transmission 5 with the integrated electrostatic actuator 1. When driving power is supplied and an actuating signal is transmitted to the integrated electrostatic actuator 1 via the connection 3 by the power source and control unit 2, the integrated electrostatic actuator 1 performs mechanical operation according to the actuating signal and transmits this to the movable device 4 via the transmission 5, and as a result, the movable device 4 is moved.

Conversely, the operation of the movable device 4 is transmitted to the integrated electrostatic actuator 1 via the transmission 5, an electric signal corresponding to the operation of the movable device 4 is generated by the integrated electrostatic actuator 1, transmitted to the control unit 2 via the connection 3 and fetched as an electric signal corresponding to the operation of the movable device 4. As only charging current effectively flows in the integrated electrostatic actuator 1, the efficiency can be further enhanced, compared with that of the conventional system.

The integrated electrostatic actuator 1 can be greatly miniaturized because of micro-fabrication technology using semiconductor micro-fabrication technology. For example, if the minimum machining dimension is 0.5 μm, the body of the integrated electrostatic actuator 1 can be miniaturized up to 1 mm or less. It can be miniaturized up to one tenth or less of the conventional structure using a coil.

Figure 2A:
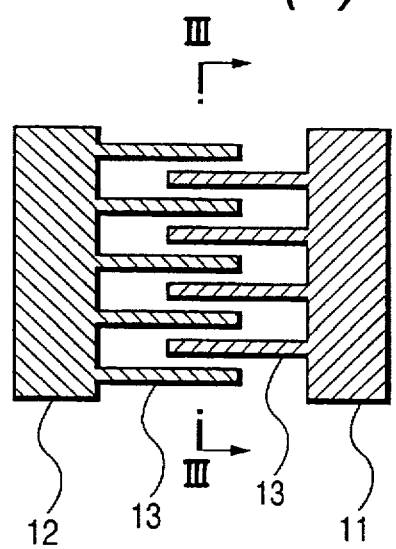
FIG. 2(a) shows an embodiment of an integrated electrostatic actuator with the simplest structure and FIG. 2(b) shows an embodiment of an integrated electrostatic actuator provided with supporting structure as a movable electrode between supporting structures as two fixed electrodes.

FIG. 2 shows the structure of the integrated electrostatic actuator. FIG. 2(a) is a schematic sectional view showing an example of the simplest structure. Reference numbers 11 and 12 denote supporting structures respectively consisting of an electric conductor, the supporting structures respectively function as a fixed or movable electrode and are provided with a comb electrode 13, and the respective comb electrodes 13 are constituted so that they are alternated.

If voltage V is applied between the comb electrodes of these supporting structures 11 and 12, the force F operating between these supporting structures 11 and 12 is shown in the following expression:

$$F = \alpha V \qquad (1)$$

Here, "α" shows a proportional constant.

Therefore, if the supporting structure 11 is fixed and voltage V is applied between the supporting structures 11 and 12, the displacement x of the supporting structure 12 is obtained in the following expression corresponding to the generated force F shown in the expression (1):

$$x = \beta F \qquad (2)$$

Here, "β" shows a proportional constant.

Therefore, the relationship between the final displacement x and applied voltage V is shown in the following expression:

$$x = \alpha \beta V \qquad (3)$$

The expression (3) shows there is the linear relationship between the displacement and applied voltage and the relationship can be provided as a structural parameter. Therefore, it can be also theoretically proved that greatly efficient electromechanical transduction is enabled by setting an appropriate structural parameter.

Figure 3:
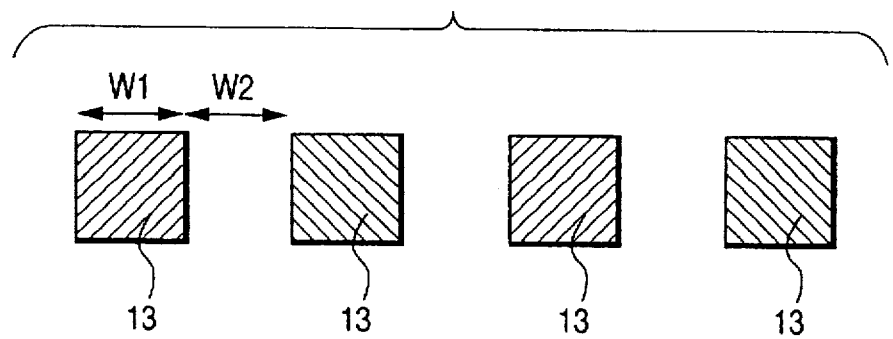
FIG. 3 is a sectional view showing an example of the structure of the comb electrode of the supporting structure as an electrode.

FIG. 3 is a sectional view showing an example of the structure of a comb electrode 13 of the supporting structures 11 and 12 as an electrode. The comb electrodes 13 are formed on each supporting structure so that they are alternated on the same plane. The sectional view of FIG. 3 is a part of the integrated electrostatic actuator viewed along a line A—A in FIG. 2(a). If the width of each comb electrode 13 is w1, an interval between these comb electrodes is w2 and the width and the interval are equal for simplification, the force F operating between these supporting structures 11 and 12 is increased according to the expression (1) when the interval w2 is reduced. This reason is that a parameter a in the expression (1) is enlarged because the capacitance between electrodes is increased. Therefore, to obtain high sensitivity, the interval w2 is required to be reduced.

In the sectional view of electrodes shown in FIG. 3, the width and the thickness of an electrode are approximately equal, however, this is not necessarily a requisite condition and they are determined by parameters such as the mechanical strength of an electrode and the weight of an electrode which has an effect upon its intrinsic vibration frequency.

In the meantime, as large charging current corresponding to the capacitance of an electrode flows as described above if the capacitance between electrodes is increased, power consumption is increased. The value of w2 is required to be determined in consideration of force required for driving and power consumption. A suitable value of w2 is generally 0.1 to 10 μm and the width of the entire integrated electrostatic actuator are generally 3 to 1500 μm, however, particularly when the value is 0.2 to 1 μm and the width is 10 to 200 μm, microminiaturization and high sensitivity can be concurrently achieved. It is natural that the value of w2 and the width of the entire integrated electrostatic actuator differ a little depending upon a purpose and an appropriate value can be selected according to each purpose.

The structure shown in FIG. 3 can be readily designed in the case of the traders concerned and can be realized by normal semiconductor micro-fabrication technology. That is, a sacrifice layer such as a silicon oxide film is grown on a silicon substrate, a thin film consisting of material such as polycrystalline silicon is deposited on it and after processing, the structure of a predetermined electrostatic actuator can be realized by removing the sacrifice layer such as a silicon oxide film.

This integrated electrostatic actuator is not necessarily required to consist of a comb electrode as shown in FIG. 2(a) and FIG. 3. For example, if a plane-parallel electrode is used, the same effect can be obtained. However, it is apparent that comb electrode structure or structure like it is most efficient.

It is apparent that such comb electrode structure includes not only the type which can be moved laterally but the type which can be moved vertically. For example, referring to FIG. 2(a), the supporting structure 11 consisting of an electric conductor is fixed and the force by a spring may be always applied to the supporting structure 12 consisting of an electric conductor so that the supporting structure is displaced, for example rightward in the drawing. In this case, the supporting structure 12 can be moved leftward and rightward in the drawing for the supporting structure 11 by varying displacement depending upon voltage applied between the supporting structures 11 and 12.

As structure for obtaining larger driving force, for example the structure in which the comb electrodes 19 of a movable electrode 15 as supporting structure are alternated between the respective comb electrodes 17 and 18 of fixed electrodes 14 and 16 as supporting structures as shown in FIG. 2 (b) is effective. In FIG. 2 (b), the fixed electrodes 14 and 16 are required to be fixed structurally and their movement may be utilized by a coupling arm extended from the movable electrode 15. In this case, the movable electrode 15 is required to be ground potential and positive and negative voltage is required to be respectively applied to the fixed electrodes 14 and 16. Or when constant voltage $+V_d$ and constant voltage $-V_d$ are respectively applied to the fixed electrodes 14 and 16 and driving voltage $V_a$ is applied to the movable electrode 15, driving force is generated between the fixed electrode and the movable electrode because the force operating to the movable electrode 15 is added.

The magnitude F (X) of the force is obtained in the following expression:

$$F(X) = 4 (AHN/S) V_d V_a \quad (4)$$

That is, in three electrode-type integrated electrostatic actuator, driving force F (X) is proportional to the product of driving voltage Va and constant voltage $V_d$. At this time, the combination of constant voltage applied to the fixed electrode 14 and the fixed electrode 16 may be another combination. For example, if voltage $V_a$ is constant and voltage $+V_d$ (voltage $-V_d$) is varied, the same result can be also obtained.

Figure 4A:
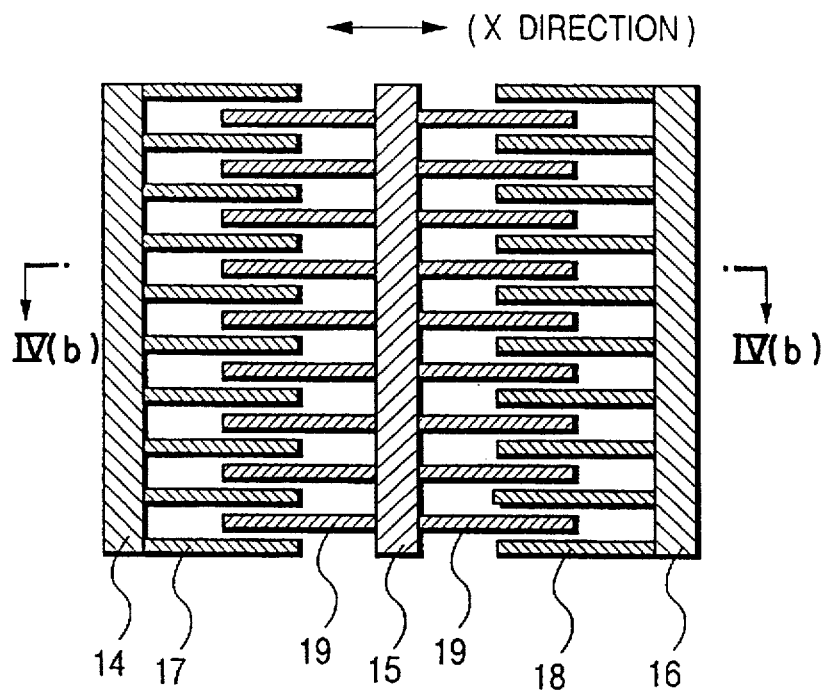
FIGS. 4(a) and (b) are explanatory drawings showing another example of the integrated electrostatic actuator used in the embodiment of the present invention.

FIGS. 4(a) and (b) are explanatory drawings showing another example of the integrated electrostatic actuator used in the embodiment of the present invention. Hereinafter, an electrode as supporting structure will be called only an electrode for simplification.

Figure 2B:
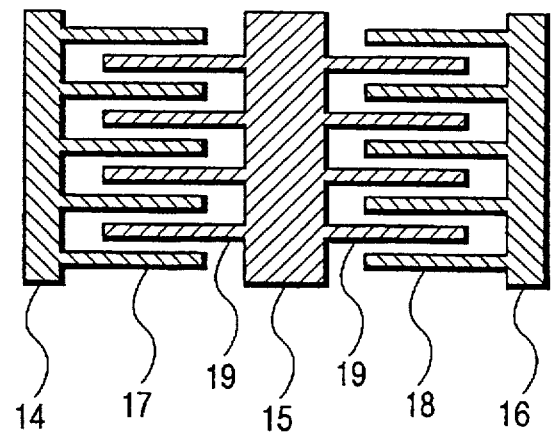
Figure 4B:
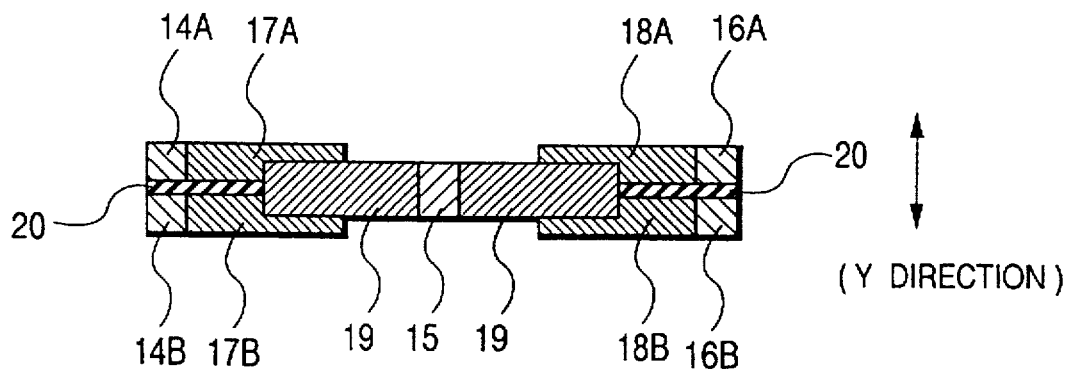

FIG. 4(a) shows an example of the structure of an integrated electrostatic actuator formed so that each comb electrode 19 of the movable electrode 15 is alternated between each comb electrode 17 and 18 of the fixed electrodes 14 and 16 of the same type as shown in FIG. 2(b) and this example is devised so that the force in the direction of Y (the horizontal direction is X and the vertical direction is Y as shown in FIGS. 4(a) and (b)) can be applied to the movable electrode 15. FIG. 4(b) is a sectional view viewed along a line A—A in FIG. 4(a) in the direction shown by arrows. The fixed electrodes 14 and 16 and their comb electrodes 17 and 18 are respectively partitioned into two parts A and B as shown in FIG. 4(b) by insulating portions 19. The movable electrode 15 and each comb electrode 19 shall operate commonly on partitioned each comb electrode 17 and 18. For example, if voltage $V_a$ is applied to the movable electrode 15 and $(+V_d+E_d)$, $(+V_d-E_d)$, $(-V_d+E_d)$ and $(-V_d-E_d)$ are respectively applied to the fixed electrodes 14A, 14B and the fixed electrodes 16A and 16B, the driving force F(Y) in the direction of Y is obtained in the following expression:

$$F(Y) = 4 (AHN/S) E_d V_a \quad (5)$$

Therefore, one integrated electrostatic actuator with the section shown in FIG. 4(b) can obtain two-dimensional driving force of X and Y.

Figure 5:
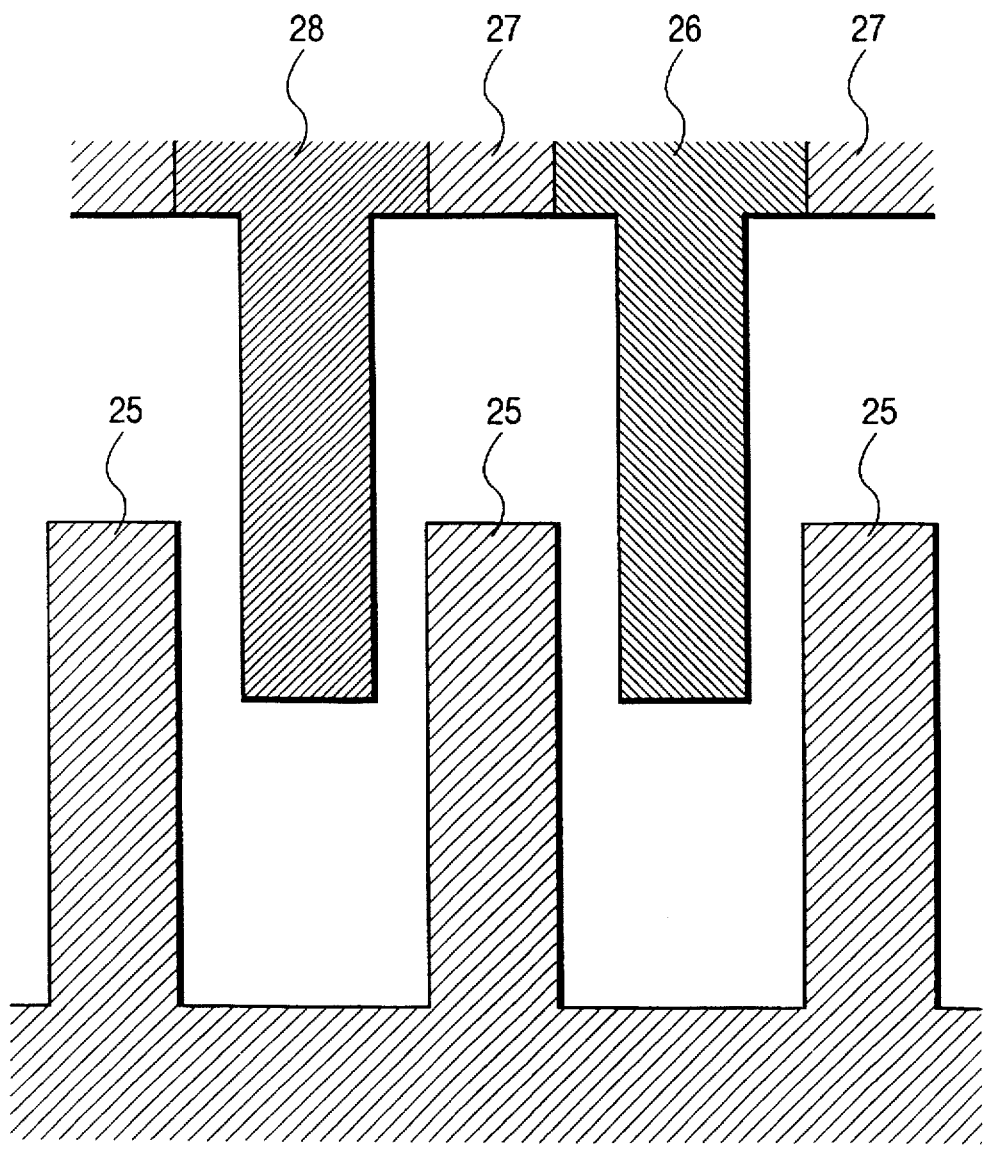
FIG. 5 shows an embodiment of the structure of an integrated electrostatic actuator using a dielectric comb electrode.

Further, the driving force operating on the movable electrode can be increased by using a dielectric for a part of an electrode of the integrated electrostatic actuator. FIG. 5 is a partial schematic drawing showing an integrated electrostatic actuator with the simplest structure in which a dielectric is used for a part of its electrode.

As the above example, comb electrode structure consisting of a dielectric 25 is opposite to comb electrode structure in which conductive electrodes 26 and 28 are arranged via an insulator 27 so that respective comb electrodes are alternated. If positive potential is applied to the conductive electrode 26 and negative potential is applied the conductive electrode 28 in this structure, the electrostatic force is generated between the electrodes 26 and 28 and the dielectric electrode 25 which is proportional to the voltage between these conductive electrodes 26 and 28 and the dielectric constant of the dielectric electrode 25. It is natural that the insulator 27 between the conductive electrodes is required to be sufficiently resistant to the voltage applied between the conductive electrodes 26 and 28. The length, width and material of the comb dielectric electrode 25 and comb conductive electrodes 26 and 28 can be determined when the structure and dielectric constant for obtaining required characteristics are determined. For example, if an operable stroke is extended, the length of each comb electrode is required to be extended up to a required value. To secure a stroke of 30 µm, the length of each comb electrode is required to be approximately 40 µm or more. It is natural that the rigidity of each comb electrode is required to be so strong that no comb electrode is deformed by the applied voltage.

It is natural that the section of the integrated electrostatic actuator shown in FIG. 5 is the same as that shown in FIG. 3 and to generate large force, a parameter in design such as increasing the opposite area of each comb electrode is required to be varied. The section of each comb electrode is not limited to a square and may be in an arbitrary shape. In the case of the electrostatic actuator using a dielectric equivalent to this embodiment, strontium titanate is used for the material of the dielectric electrode 25.

A variety of applications using the above-described integrated electrostatic actuator will be described below.

Figure 6:
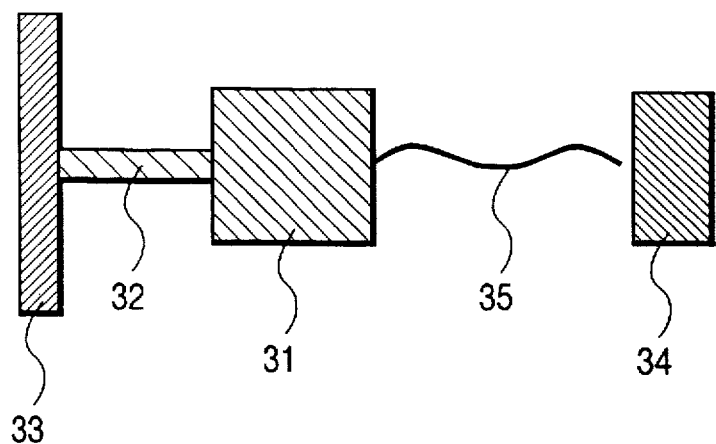
FIG. 6 is a schematic block diagram showing an embodiment of a speaker using an integrated electrostatic actuator.

FIG. 6 is a schematic block diagram showing a speaker using the integrated electrostatic actuator. The speaker is constituted by the integrated electrostatic actuator 31 and a diaphragm 33 mechanically coupled to this via a coupling 32. When an electric signal is input to the integrated electrostatic actuator 31 from a signal generator 34 via a cable 35, the integrated electrostatic actuator 31 is operated according to the electric signal. This mechanical operation is transmitted to the diaphragm 33 via the coupling 32 and the electric signal form the signal generator 34 is finally transduced to a sound.

In this embodiment, generally sufficient force can be generated by setting the distance w2 between the electrodes 13 shown in FIG. 3 to 0.3 µm and setting the entire width of the integrated electrostatic actuator 31 to approximately 100 µm. In this case, as the intrinsic vibration frequency of the integrated electrostatic actuator 31 can be increased enough up to approximately 30 kHz, a complete frequency response can be obtained in the wide range from a low sound to a high sound. In the meantime, it is natural that to realize a large-sized speaker, the electrostatic actuator 31 is required to be also enlarged, however, a response to a high sound is reduced because at this time the intrinsic vibration frequency is reduced.

The electrostatic actuator 31, diaphragm 33 and the signal generator 34 can be integrated on one semiconductor chip to form integrated speaker system.

Figure 7:
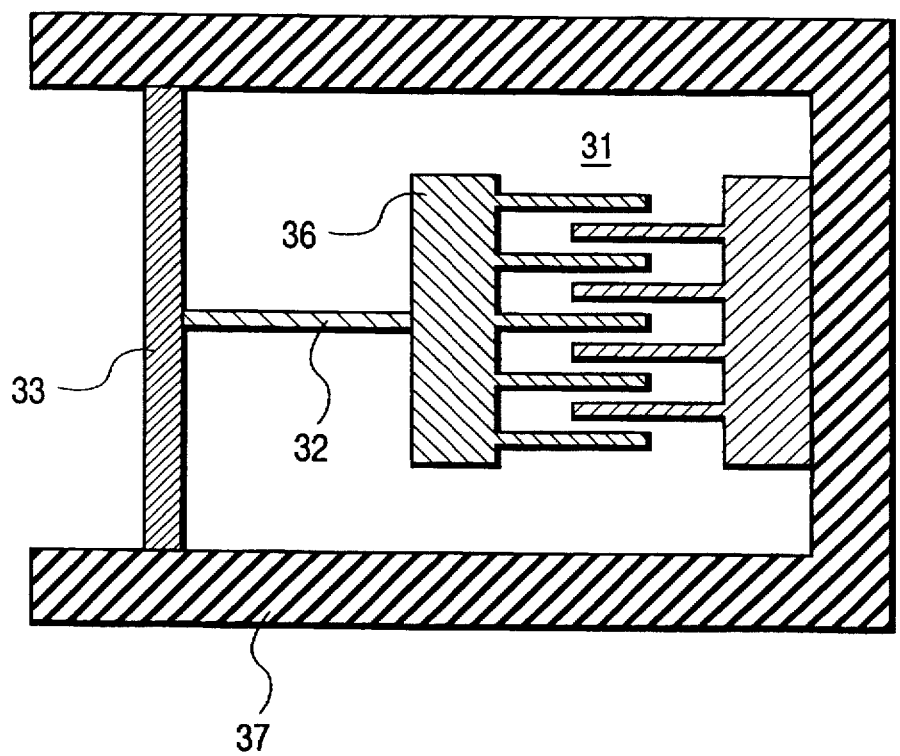
FIG. 7 is a sectional view showing an example of the concrete structure of the speaker shown in FIG. 6.

FIG. 7 is a sectional view showing an example of the concrete structure of the speaker shown in FIG. 6. The integrated electrostatic actuator 31 provided with a movable electrode 36 provided with comb electrodes formed so that they are alternated and the diaphragm 33 coupled to the integrated electrostatic actuator 31 via the coupling 32 are fixed on a frame 37. The mechanical vibration of the movable electrode 36 provided with the comb electrodes operates the diaphragm 33 and the operation is transduced to the energy of a sound. The diaphragm 33 may be made of anything if only its oscillation frequency response is satisfactory and for example, may be made of diamond, paper, plastic and metal. The coupling 32 is required to be made of material which is not deformed by vibration and does not cause the attenuation of vibration. For example, ceramic and engineering plastic may be used, however, this material is not necessarily the requisite condition of the present invention. The signal generator 34 and the cable 35 are not shown in FIG. 7.

Figure 8:
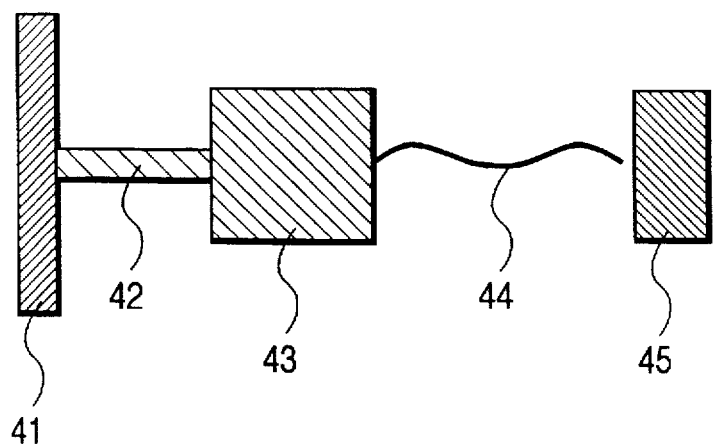
FIG. 8 is a schematic block diagram showing an embodiment of a microphone using an integrated electrostatic actuator.

FIG. 8 is a schematic block diagram showing a microphone using the integrated electrostatic actuator. A diaphragm 41 is coupled to the integrated electrostatic actuator 43 via coupling structure 42. An electric signal control unit 45 is connected to the integrated electrostatic actuator 43 via an electric signal transmission 44. A sound from outside is transduced to its mechanical operation by the diaphragm 41 and transmitted to the integrated electrostatic actuator 43 by the coupling mechanism 42. The mechanical vibration is transduced to an electric signal by the integrated electrostatic actuator 43, this electric signal is transmitted to the electric signal control unit 45 via the electric signal transmission 44 and fetched as an electric signal outside.

It is natural that transduction of mechanical vibration to an electric signal by the integrated electrostatic actuator 43 is enabled by the measurement of electrostatic capacitance by the operation of the comb electrodes, however, higher precision transducing method depends upon the measurement of tunneling current.

Figure 9:
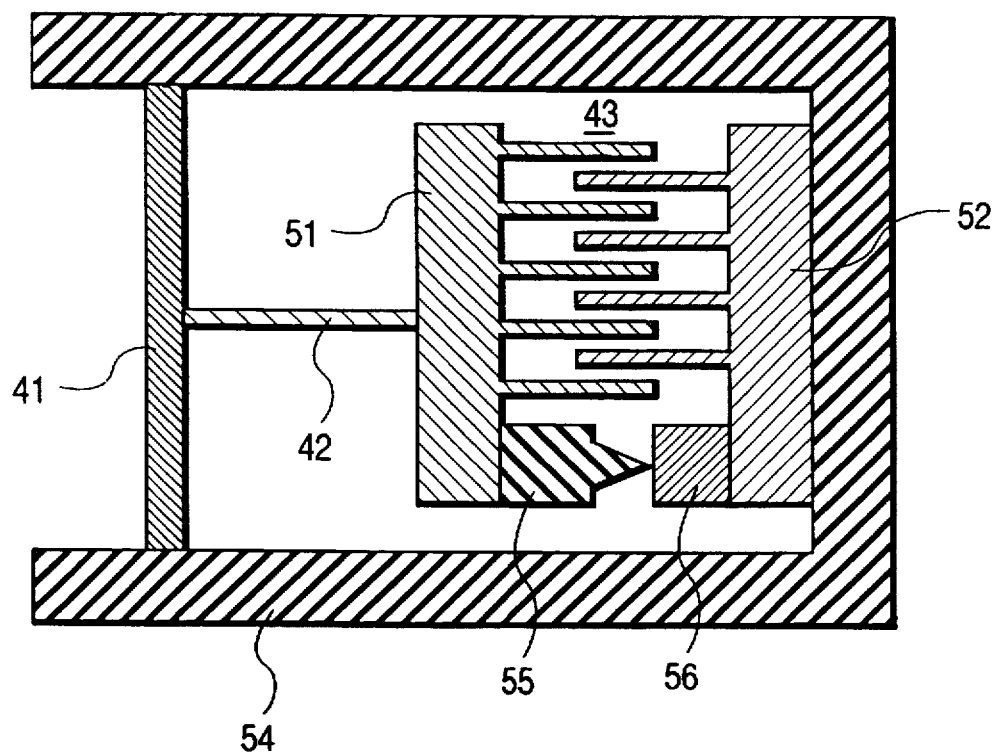
FIG. 9 is a sectional view showing an example of the concrete structure of the microphone shown in FIG. 8.

FIG. 9 is a sectional view showing an example of the concrete structure of the microphone shown in FIG. 8. The microphone is provided with the integrated electrostatic actuator 43 provided with a movable electrode 51 and a fixed electrode 52 provided with comb electrodes formed so that they are alternated with each other and the diaphragm 41 coupled to the actuator 43 via the coupling 42. The ends of the diaphragm 41 are fixed on a frame 54. The fixed electrode 52 of the actuator 43 is also fixed on the frame 54. The actuator 43 is provided with a portion 55 functioning as a probe between the movable electrode 51 and the fixed electrode 52 and a portion 56 functioning as an opposite electrode and constituted so that predetermined tunneling current always flows between these probe and opposite electrode when no vibration is applied to the diaphragm 41. When vibration is applied to the diaphragm 41, it is transmitted to the movable electrode 51 of the actuator 43 by the coupling structure 42. As a result, tunneling current which flows between the portion 55 functioning as the probe and the portion 56 functioning as the opposite electrode is vibrated. As the operation of the diaphragm 41 of approximately 0.1 nm or less can be detected and can be transduced to an electric signal if the force operating between the electrodes can be controlled by controlling voltage applied between the electrodes 51 and 52 so that this tunneling current is constant, extremely high sensitive microphone can be realized. Therefore, micro aerial vibration which could not be detected heretofore can be detected.

Figure 10:
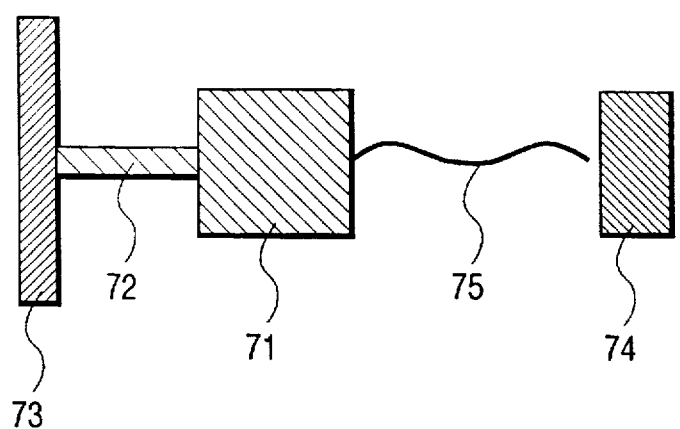
FIG. 10 is a schematic block diagram showing an embodiment of a microminiaturized radio using an integrated electrostatic actuator.

FIG. 10 is a schematic block diagram showing a microminiaturized radio using the integrated electrostatic actuator. A diaphragm 73 is coupled to the actuator 71 via a mechanical coupling 72. A receiver 74 is connected to the actuator 71 via an electric signal transmission 75. A radio wave received by the receiver 74 is transduced to an electric signal and operates the actuator 71 via the electric signal transmission 75. Mechanical oscillation generated in the actuator 71 moves the mechanical coupling 72 and is transmitted to the diaphragm 73 as vibration. This vibration vibrates air as a sound and this apparatus functions as a radio.

As in the microminiaturized radio equivalent to this embodiment, the receiver 74 is substituted for the signal generator 34 in the embodiment of the speaker shown in FIG. 6 and its concrete structure is substantially the same as that in FIG. 7, the description of the microminiaturized radio will be omitted. According to this embodiment, its dimension can be reduced, power consumption can be minimized and if for example, the receiver 74, the electric signal transmission 75, the electrostatic actuator 71, the mechanical coupling 72 and the diaphragm 73 are formed on the same chip by semiconductor micro-fabrication technology, they can be integrated in the area a few mm square. The battery for driving can be also reduced and it can be also integrated on the above-described chip, for example as a solar battery. For example, in this embodiment, all the functions can be integrated on a chip 3 mm square by integrated circuit technology of the minimum work dimension 0.5 μm. Therefore, the microminiaturized radio equivalent to this embodiment can be attached to the end of writing materials and can be used for personal background music. The microminiaturized radio can be directly put near a person's ears as earrings and can be also used as a personal radio.

Figure 11:
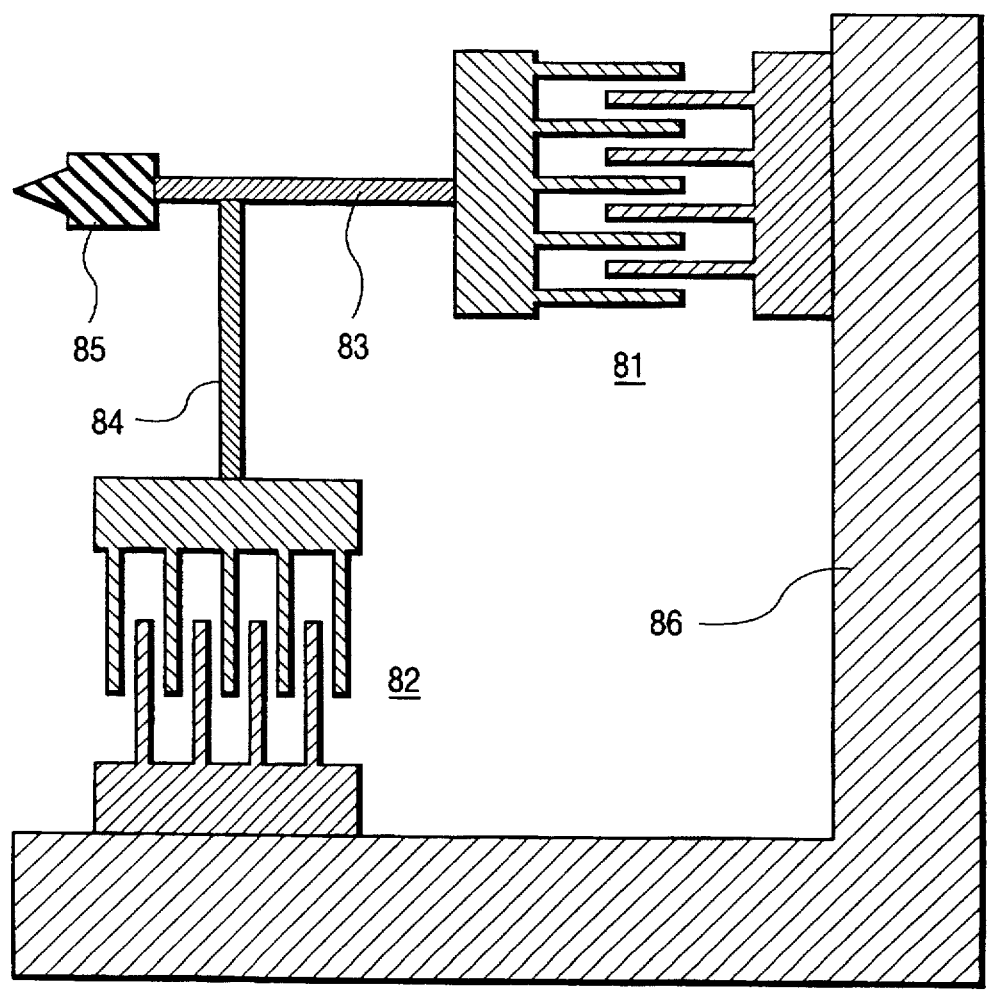
FIG. 11 is a block diagram showing the structure of an embodiment of a scanning tunneling microscope using an integrated electrostatic actuator.

FIG. 11 is a block diagram showing the structure of a scanning tunneling microscope using the integrated electrostatic actuator. This embodiment is provided with a first actuator 81 and a second actuator 82, each actuator 81 and 82 is provided with a movable electrode and a fixed electrode, each fixed electrode is fixed on a frame 86 and each movable electrode is coupled to a probe 85 via each coupling structure 83 and 84. Further, a third actuator not shown is formed in the direction perpendicular to the space of FIG. 11, its fixed electrode is fixed on the frame 86 and its movable electrode is coupled to the probe 85 via the coupling structure. In this embodiment, the probe 85 is moved respectively laterally and longitudinally in the space of FIG. 11 by the first actuator 81 and the second actuator 82 and moved vertically in the space of FIG. 11 by the third actuator. A scanning tunneling microscope using the integrated electrostatic actuator which can be operated three-dimensionally can be realized by forming the microscope so that it has such structure.

Figure 12:
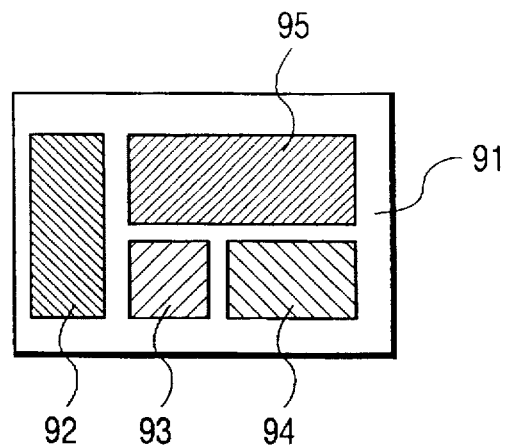
FIG. 12 is a schematic block diagram showing an embodiment of one chip scanning tunneling microscope wherein the scanning tunneling microscope which can be operated three-dimensionally shown in FIG. 11 is constituted on one chip.

FIG. 12 is a schematic block diagram showing one chip scanning tunneling microscope wherein the scanning tunneling microscope shown in FIG. 11 which can be operated three-dimensionally is constituted on one chip. The scanning tunneling microscope 92 shown in FIG. 11 which can be operated three-dimensionally, a control circuit element 93 for the above scanning tunneling microscope 92 which can be operated three-dimensionally, a storage device 94 required for operating the control circuit element and a power unit 95 for generating electric energy required for driving the control circuit element 93 and the storage device 94 or/and storing the energy are formed on the chip 91. If necessary, the control circuit element 93 or/and the storage device 94 may be provided with a communication facility. That is, they may be provided with a facility for sending and receiving data obtained by the one chip scanning tunneling microscope or a signal for instructing the operation of the one chip scanning tunneling microscope. As the one chip scanning tunneling microscope can be operated without connection to an external device via an electric wire and the obtained data can be fetched by being provided with these facilities, the degree of freedom of operation can be remarkably increased.

Figure 13:
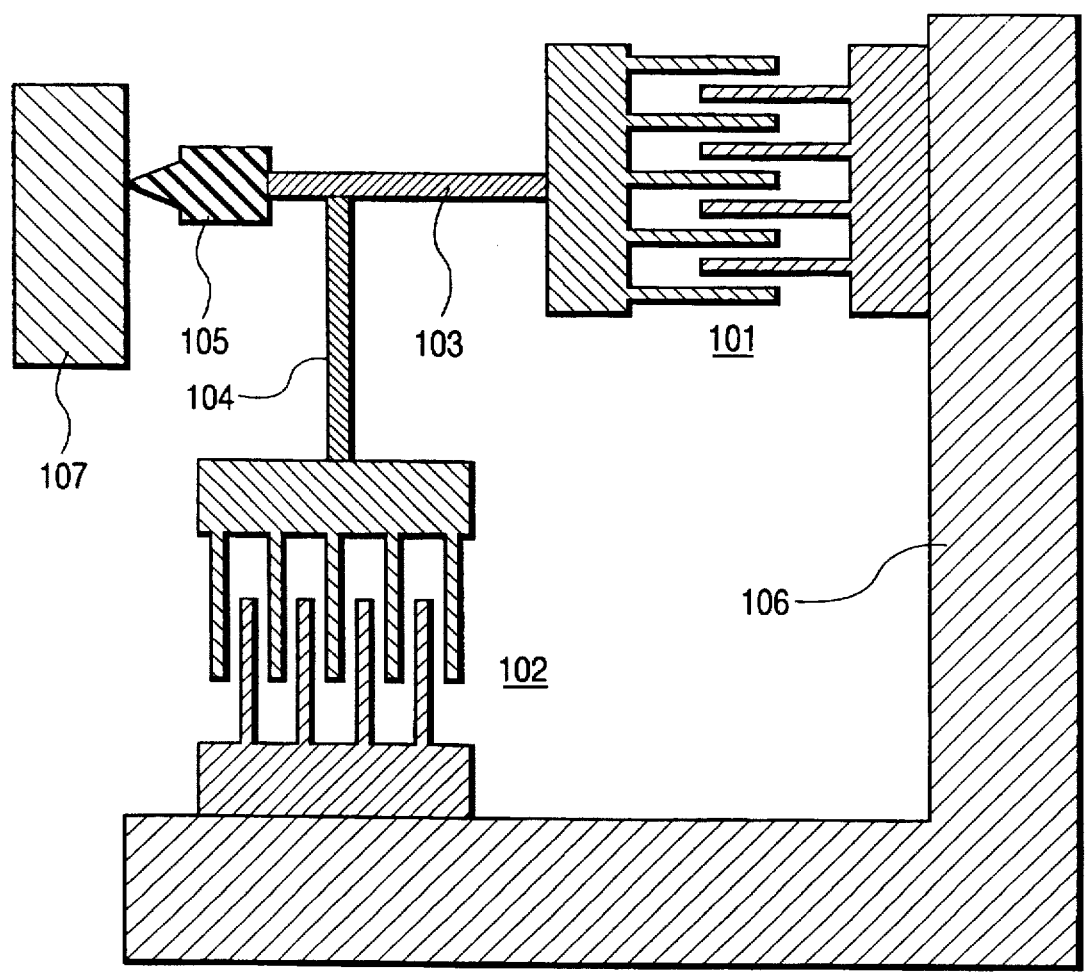
FIG. 13 is a block diagram showing an embodiment of a microminiaturized record and reproduction device using an integrated electrostatic actuator.

FIG. 13 is a block diagram showing a microminiaturized record and reproduction device using the integrated electrostatic actuator. The embodiment shown in FIG. 13 is also essentially the same as the scanning tunneling microscope shown in FIG. 11 which can be operated three-dimensionally. This embodiment is also provided with a first actuator 101 and a second actuator 102, each actuator 101 and 102 is provided with a movable electrode and a fixed electrode, each fixed electrode is fixed on a frame 106 and each movable electrode is coupled to a probe 105 respectively via coupling structures 103 and 104. Further, a third electrostatic actuator not shown is formed in the direction perpendicular to the space of FIG. 13, its fixed electrode is fixed on the frame 106 and its movable electrode is coupled to the probe 105 via coupling structure. An information recording medium 107 is installed apart by the distance so far that predetermined tunneling current can flow in a position opposite to the probe 105. In this embodiment, the operation of the probe 105 is also the same as the probe 85 shown in FIG. 11 which can be operated three dimensionally. Therefore, information can be recorded in the information recording medium 107 by the operation of the probe 105 according to an electric signal applied to each actuator. In this case, an arbitrary method of recording information may be adopted and for example, a method of adding a dot to the information recording medium 107 by evaporation from the conductive probe 105 in an electric field or causing the phase change of the information recording medium 107 by tunneling current which flows from the probe 105 to the information recording medium 107 may be adopted. Further, the information recorded in the information recording medium 107 by such a method can be read.

Figure 14:
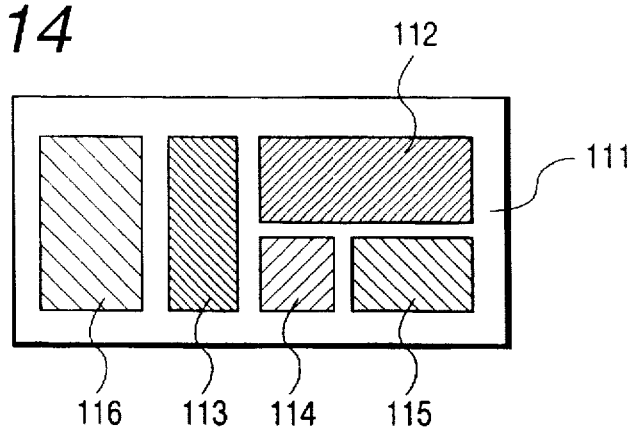
FIG. 14 is a schematic block diagram showing an embodiment of a microminiaturized music reproduction device using the microminiaturized record and reproduction device shown in FIG. 13.

FIG. 14 is a schematic block diagram showing a microminiaturized music reproduction device using the microminiaturized record and reproduction device shown in FIG. 13. The microminiaturized record and reproduction device 113 shown in FIG. 13, a control circuit 114, a storage circuit 115 for the control circuit, a power source 112 and further, the speaker shown in FIG. 6 are formed on the chip 111. Music data recorded in the microminiaturized record and reproduction device 113 is read by the control circuit 114 operated according to a control signal sent from the storage circuit 115 for the control circuit and reproduced as a sound by the speaker 116. Hereby the dimension of the entire chip 111 can be approximately 3 mm square by using micro-fabrication technology of the minimum dimension of 0.5 μm. If this chip 111 is used as the microminiaturized radio shown in FIG. 10, a personal microminiaturized music reproduction device can be realized.

Next, an embodiment of an integrated micro-fabricated device wherein the scanning probe microscope structure provided with the integrated electrostatic actuator shown in FIG. 11 or 13 is more readily formed on one substrate and further integrated will be described. As the integrated micro-fabricated device equivalent to this embodiment can be formed by semiconductor micro-fabrication technology precisely and a large number of integrated micro-fabricated devices can be arrayed two- or one-dimensionally on one basic substrate, the high speed observation and modification can be achieved without reducing the resolution of the scanning probe microscope. The integrated micro-fabricated device can be also provided with the high degree of integration as a record and reproduction device.

Figure 15:
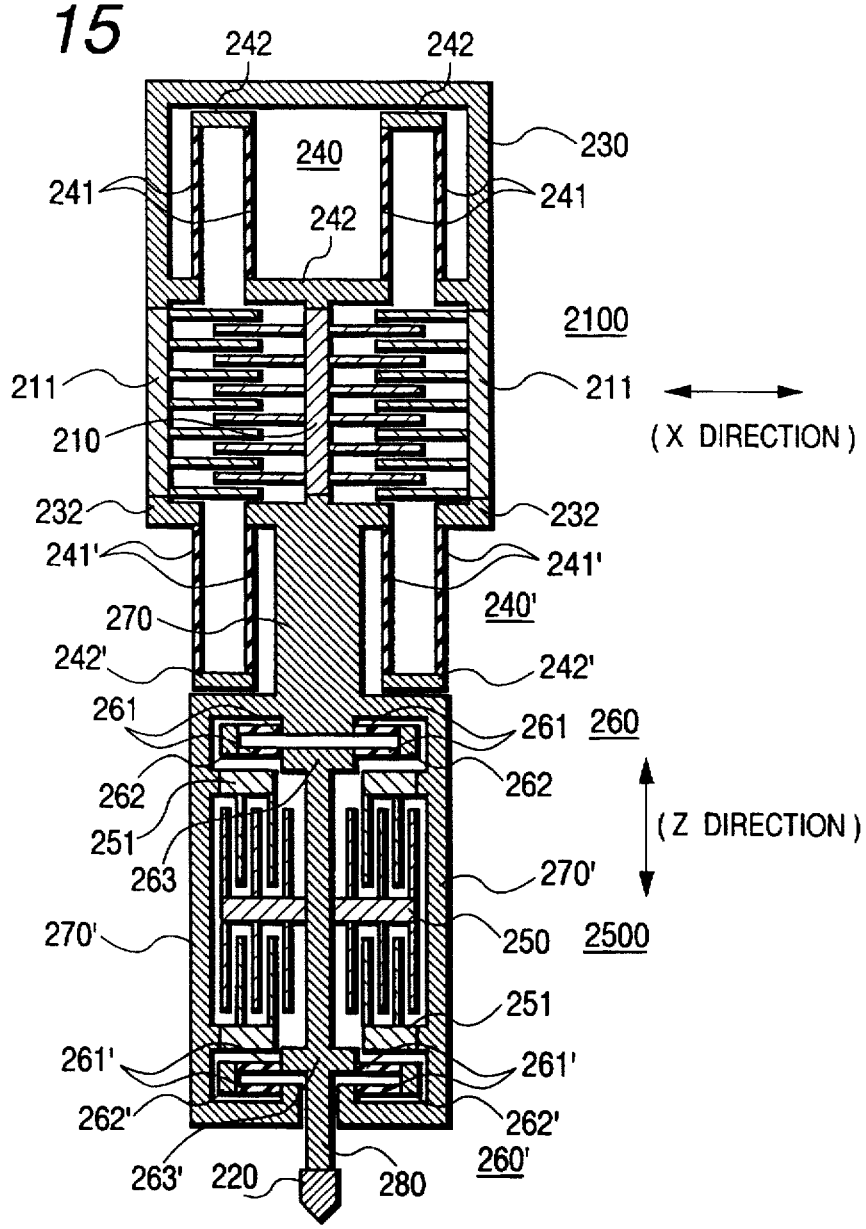
FIG. 15 is a block diagram showing the structure of another embodiment of a surface observing apparatus (scanning tunneling microscope) using an integrated electrostatic actuator.

FIG. 15 is a block diagram showing another structure of the surface observing apparatus (scanning tunneling microscope) using the integrated electrostatic actuator. In this embodiment, a first integrated electrostatic actuator 2100 and a second integrated electrostatic actuator 2500 are cascade-connected differently from the embodiment shown in FIG. 11. That is, the fixed electrode 270 of the second actuator 2500 is connected to the movable electrode 210 of the first actuator 2100 and a probe 220 is provided to the end of an extended portion of the movable electrode 250 of the second actuator 2500. The first integrated electrostatic actuator according to this embodiment can drive in the direction of X and in the direction of Y by only one actuator as described in relation to FIGS. 4(a) and (b). Therefore, a motion in the directions of X and Y is controlled by the first actuator 2100 and a motion in the direction of Z is controlled by the second actuator 2500.

The fixed electrode 211 of the actuator 2100 is formed at the end of a base 230 and a spring 240 consisting of leaf springs 241 and couplings 242 for coupling them is also formed at the end of the base 230. The movable electrode 210 of the actuator 2100 is coupled to the coupling 242 of the spring 240. The other end of the fixed electrode 211 of the actuator 2100 is coupled to the end 232 of the base and here, a spring 240' consisting of leaf springs 241' and couplings 242' for coupling them is formed. The movable electrode 210 of the actuator 2100 and a Z-direction driving shaft 270 are coupled to the coupling of the spring 240'. As driving force operating between the fixed electrode 211 and the movable electrode 210 of the actuator 2100 respectively bends the springs 240 and 240', the Z-direction driving shaft 270 is positioned according to driving force by the actuator 2100 in the direction of X (laterally in the space of FIG. 15) and in the direction of Y (perpendicularly to the space).

The integrated electrostatic actuator 2500 is formed at the end of the Z-direction driving shaft utilizing the Z driving shaft 270 in place of the above base 230. That is, a fixed electrode 251 supported by a frame 270' integrated with the Z-direction driving shaft 270 is formed, and a spring 260 consisting of leaf springs 261 fixed on the frame 270' similarly and couplings 262 for coupling them and a spring 260' consisting of leaf springs 261' and couplings 262' for coupling them are formed. Probe supporting structure 280 at the end of which the probe 220 is attached is coupled to the coupling 263 of the spring 260 and the coupling 263' of the spring 260' and the movable electrode 250 of the actuator 2500 is coupled to the probe supporting structure 280. As driving force operating between the fixed electrode 251 and the movable electrode 250 of the actuator 2500 respectively bends the springs 260 and 260', the probe supporting structure 280 is positioned in the direction of Z (longitudinally in the space). In this embodiment, the Z-direction driving shaft 270 is controlled in the directions of X and Y by the actuator 2100 and in this state, the probe is controlled in the direction of Z.

In FIG. 15, wiring to each electrode, wiring for applying voltage to the probe and further the description of whether insulation is required or not, are omitted for simplification of the drawing, however, as these can be realized by arbitrary constitution if necessary, these will not be described below.

In the embodiment shown in FIG. 15, the structure can be arranged one-dimensionally on one basic substrate and integrated by semiconductor micro-fabrication technology, the base 230 and the end of the base 232 may be directly attached on one basic substrate, the other part is processed by semiconductor micro-fabrication technology and the surface observing apparatus provided with the integrated electrostatic actuator can be constituted apart from the substrate. Therefore, the integrated surface observing apparatus can be extremely readily arranged one-dimensionally on one chip.

An integrated surface observing apparatus arranged two-dimensionally can be readily formed by laminating a plurality of the integrated surface observing apparatuses each of which is arranged one-dimensionally on one chip equivalent to this embodiment.

FIGS. 16(a) to (d) show an embodiment of an integrated surface observing apparatus formed by arranging the surface observing apparatus shown in FIG. 15 provided with the integrated electrostatic actuator two-dimensionally.

FIG. 16(a) is a schematic drawing showing this embodiment and an integrated surface observing apparatus 1000 with the structure arranged two-dimensionally is formed by laminating a large number of surface observing apparatuses shown in FIG. 15 respectively provided with the integrated electrostatic actuator each of which is arranged one-dimensionally by semiconductor micro-fabrication technology. It is natural that as the integrated surface observing apparatus with the structure arranged two-dimensionally is formed by semiconductor micro-fabrication technology through it is not shown in the drawing in this embodiment, a circuit required for controlling the probe of the surface observing apparatus or memory for storing obtained data temporarily can be formed on one chip constituted on a wafer concurrently as described in relation to the embodiment shown in FIG. 12. Hereby, even if a large number of surface observing apparatuses are arranged two-dimensionally, various types of wiring can be reduced.

FIG. 16(b) is a schematic drawing showing the section of the surface observing apparatus shown in FIG. 16(a) viewed along a line A—A in the direction shown by an arrow in FIG. 16(a), FIGS. 16(c) and (d) are respectively schematic drawings showing the section viewed along a line A–B in the direction shown by an arrow in FIG. 16(b) and viewed along a line C–D in the direction shown by an arrow in FIG. 16 (c).

In FIG. 16(b), reference numbers 340 and 350 respectively denote an actuator mechanism and a probe of the surface observing apparatus described referring to FIG. 15. In addition, this embodiment is provided with a probe height adjusting circuit 330 and an I/O control circuit 320. Further, a surface observing apparatus integration control unit 310 is provided to process a control signal commonly related to surface observing apparatuses arranged on one basic silicon substrate 370 one-dimensionally. This integration control unit 310 may be distributed suitably to each apparatus and is connected to the I/O control circuit 320 of each apparatus if necessary. As the probe height adjusting circuit 330 functions independently every surface observing apparatus, it is not related to the integration control unit 310 essentially. In a process in which a surface observing apparatus is cut off from a polycrystalline silicon thin film deposited on one basic silicon substrate by semiconductor micro-fabrication technology, these circuits are formed. A partition between surface observing apparatuses arranged on one basic silicon substrate one-dimensionally is left as a coupling 360 through it is omitted in FIG. 16(a).

FIG. 16(c) is a schematic drawing showing when one silicon substrate on which surface observing apparatuses are arranged one-dimensionally is laminated on a plurality of silicon substrates on each of which surface observing apparatuses are arranged one-dimensionally. As apparent from the drawing, each circuit is directly formed on the silicon substrate as a normal semiconductor device, and the actuator mechanism 340 and the probe 350 shown in FIG. 16(a) are separated from each silicon substrate. As described referring to FIG. 15, the base 230 and the end of the base 232 are directly formed on each silicon substrate.

It should also be noted that the each actuator mechanism 340 and the probe 350, which consist the writing unit, can be removed from the silicon substrate 370 individually, and replaced by the equivalent structures.

As each surface observing apparatus equivalent to this embodiment is integrated on a silicon substrate by semiconductor micro-fabrication technology, the actuator mechanism 340, the probe height adjusting circuit 330, the I/O control circuit 320 and the surface observing apparatus integration control unit 310 can be integrated with a probe driving mechanism on a silicon substrate by semiconductor micro-fabrication technology. The probe height adjusting circuit 330 is a circuit for supplying driving voltage in the direction of Z for keeping the distance between a probe and a sample twenty or thirty nm or less to the actuator mechanism for driving a probe based upon physical and/or chemical mediums such as a tunneling electron (tunneling current), interatomic force, magnetic force, the superficial voltage of a sample, static electricity force, the capacity of charge, light and a spin-polarized electron (spin-polarized current) between the probe 350 and a sample 3000 and functions as so-called feedback control and a high voltage power source for a driving mechanism in a scanning probe microscope. The probe height adjusting circuit is also provided with a power source for an actuator mechanism in the directions of X and Y. The I/O control circuit 320 sets driving voltage in the directions of X and Y according to a control instruction from the surface observing apparatus integration control unit 310, transduces actuator mechanism driving voltage in the direction of Z to output information as a scanning probe microscope and outputs it to the surface observing apparatus integration control unit 310. The surface observing integration control unit 310 is provided with a function for exchanging such control instructions and information with a microprocessor or buffer memory which is an external device.

Examples of the value of the integrated surface observing apparatus shown in FIG. 16 are as follows. The integrated surface observing apparatus can be constituted so that it is 100 μm wide and approximately 10 μm thick. If $10^5$ surface observing apparatuses equivalent to this embodiment are arranged per 1 cm square ($6 \times 10^5$ surface observing apparatuses are arranged per one inch square), the scanning speed of a scanning probe microscope is 1 μm per second and further, one irregularity exists per 10 nm, $10^7$ irregularities can be observed per 1 cm square ($6 \times 10^7$ irregularities can be observed per 1 inch square) per second by the surface observing apparatus equivalent to this embodiment. As in the surface observing apparatus, a driving distance equivalent to approximately one third of the width of the actuator mechanism can be obtained in the direction of X and a driving distance equivalent to approximately one second of the thickness of the actuator mechanism can be obtained in the direction of Y as shown in FIG. 4 in the surface observing apparatus, the area equivalent to one sixth of the surface of a sample can be scanned without other coarse adjustments in the surface observing apparatus shown in FIG. 16. In that case, assuming one irregularity exists per 10 nm square, the information of $2 \times 10^{11}$ irregularities per 1 cm square ($1.2 \times 10^{12}$ irregularities per 1 inch square) can be observed.

In this embodiment, the area equivalent to one sixth of the surface of a sample can be observed without a coarse adjustment, however, a coarse adjustment is required to be provided to observe the entire surface of a sample.

Figure 17:
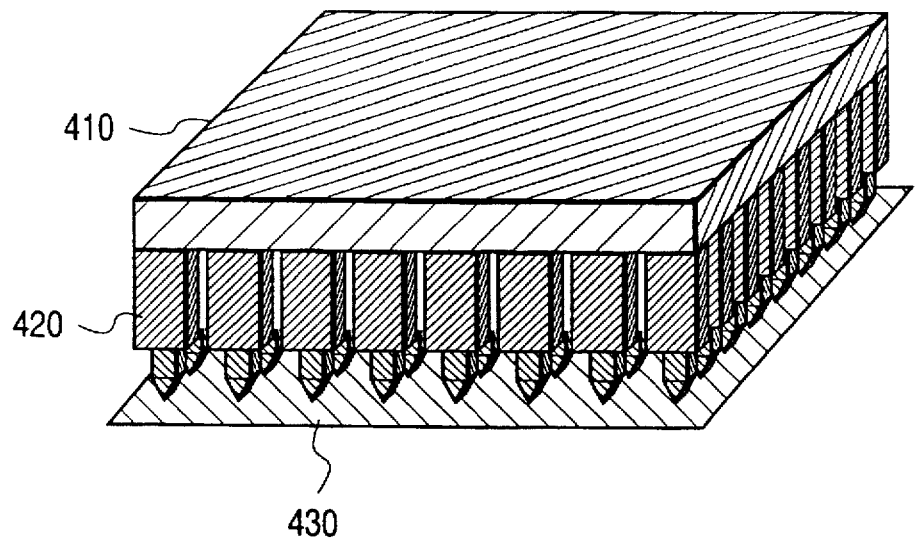
FIG. 17 is a schematic drawing showing the constitution of an embodiment in which a large number of surface observing apparatuses shown in FIG. 15 are two-dimensionally arranged and held by coarse adjustment so that the position of a probe can be controlled.

FIG. 17 shows constitution in which a large number of surface observing apparatuses 420 are arranged two-dimensionally as shown in FIG. 15 and held by a coarse adjustment 410 so that the position of a probe can be controlled. A reference number 430 denotes a sample. When the surface observing apparatuses are constituted as described above, all the surface observing apparatuses 420 are moved all together in the directions of X and Y by the coarse adjustment 410 and the entire area of the surface of the sample 430 which cannot be observed by only a driving mechanism in the directions of X and Y of an individual surface observing apparatus 420 can be observed. If a coarse adjustment 410 provided with driving capability in the direction of Z is adopted, the entire surface of a sample can be observed even if the distance of an individual surface observing apparatus 420 in the direction of Z is not sufficient. In the embodiment shown in FIG. 17, if further, the sample 430 is moved one- or two-dimensionally by a precise mobile mechanism, the observable area of the sample can be remarkably increased by the surface observing apparatuses arranged one- or two-dimensionally. In FIG. 17, a coupling between the surface observing apparatuses is also not shown as in FIG. 16(a).

Figure 18:
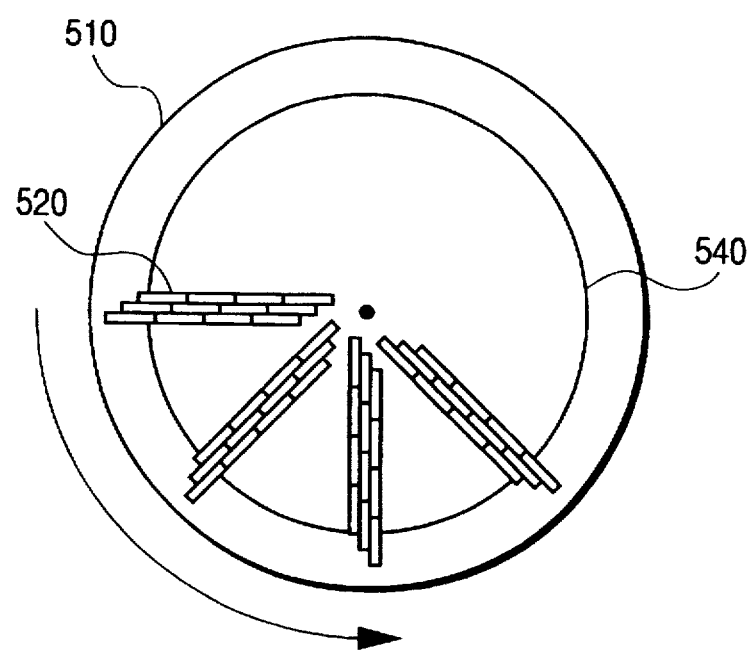
FIG. 18 is a plan explaining an embodiment of a surface observing apparatus for measuring a rotary sample or a record and reproduction device provided with a rotary record medium.

FIG. 18 is a plan view for explaining a surface observing apparatus for observing a rotated sample or an embodiment of a record and reproduction device provided with a rotated record medium.

FIG. 18 shows a group of surface observing apparatuses 520 consisting of three pieces is arranged with them shifted by one third of the width of an individual surface observing apparatus one-dimensionally opposite to a rotated sample 510 and further, shows these four sets are provided with them shifted by an appropriate angle in the rotating direction.

The rotated sample 510 does not correspond to a motion by the coarse mechanism 410 shown in FIG. 17, however, the direction of rotation is the same. If three surface observing apparatuses 520 are arranged with them shifted by one third in the direction of X (in the direction of one-dimensional arrangement) because an individual actuator mechanism in the direction of X covers approximately one third of the width of the apparatus as described in relation to the previous embodiment, the coarse mechanism in the direction of X is substantially not required. Therefore, scanning the entire surface of a sample is enabled by rotation as coarse operation and driving by an actuator mechanism for the probe of the surface observing apparatus 520 in the directions of X and Y. Observing irregularities on the same track 540 or the detection of the information of irregularities may be performed with driving of the surface observing apparatus 520 in the direction of X locked.

Assuming the sample 510 as a data disk in which the information of irregularities is held, the embodiment shown in FIG. 18 may be called a reader for reading information from a record medium. As well known, as irregularities can be formed on the surface of the sample 510 by so-called evaporation in an electric field when predetermined voltage is applied between the conductive probe of a probe microscope and the sample 510, the embodiment shown in FIG. 18 may be called a record and reproduction device as other surface observing apparatuses. Though it is natural, the speed of parallel processing can be further enhanced by providing further a large number of surface observing apparatuses 520 in the rotating direction.

Figure 19:
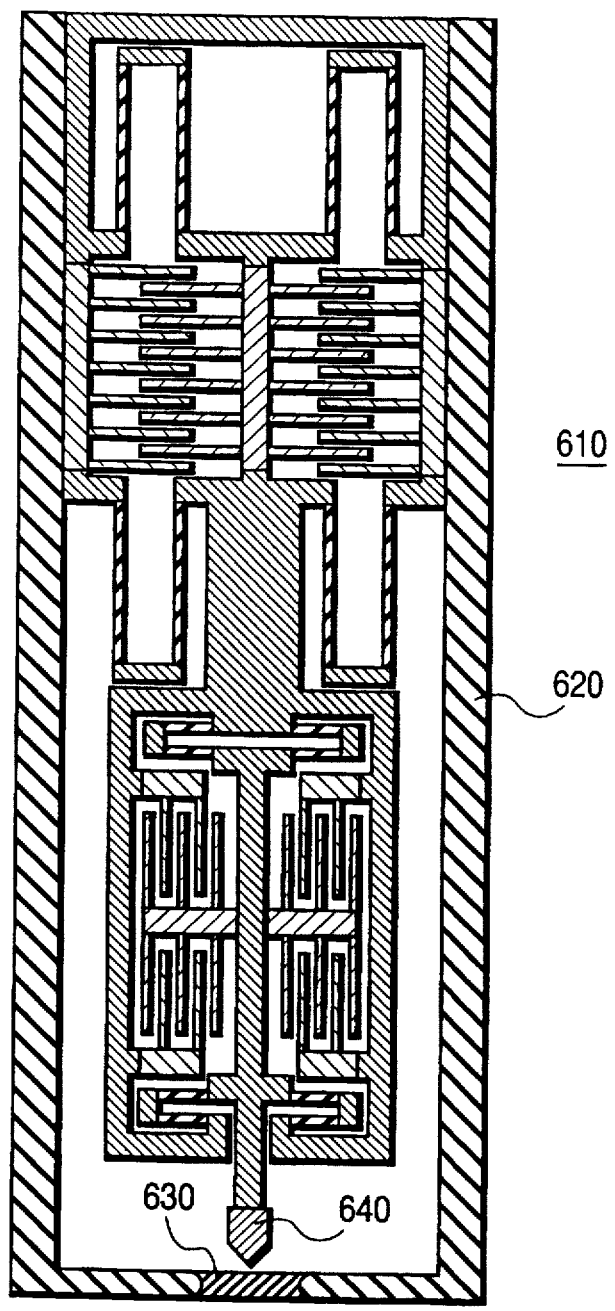
FIG. 19 is a schematic drawing showing an embodiment in which a surface observing apparatus itself is a record or reproduction device.

FIG. 19 is a schematic drawing showing an embodiment in which the surface observing apparatus is used as a record or reproduction device. In this embodiment, a probe driving mechanism 610 mainly consisting of the surface observing apparatus shown in FIG. 15 is encircled by peripheral structure 620 as shown in FIG. 19 and provided with a recorder 630 in a position opposite to a probe 640 of the probe driving mechanism 610. The peripheral structure 620 may be also used as the coupling 360 shown in FIG. 16. The probe driving mechanism 510 is provided with an actuator mechanism for driving the probe in the directions of X, Y and Z as in FIG. 15. Therefore, information can be recorded in the recorder 630 or information can be read from the recorder 630, controlling the probe 640.

In this case, if an individual surface observing apparatus is used as a recorder or a reader, a plurality of surface observing apparatuses may be also arranged two-dimensionally as shown in FIG. 16. In this case, each of a plurality of surface observing apparatuses arranged one-dimensionally may be let to correspond to one unit of data and plural groups of surface observing apparatuses may be also let to correspond to one unit of data.

Also in this embodiment, approximately one third of 100 μm can be scanned in the direction of X and approximately one second of 10 μm can be scanned in the direction of Y. Therefore, assuming that one irregularity exists per 10 nm on the surface of a sample, the information of $1.6 \times 10^6$ irregularities can be obtained by one surface observing apparatus in this embodiment. As an individual surface observing apparatus itself functions as an independent recorder or reader in this embodiment, the coarse adjustment 410 shown in FIG. 17 is not required.

Figure 20:
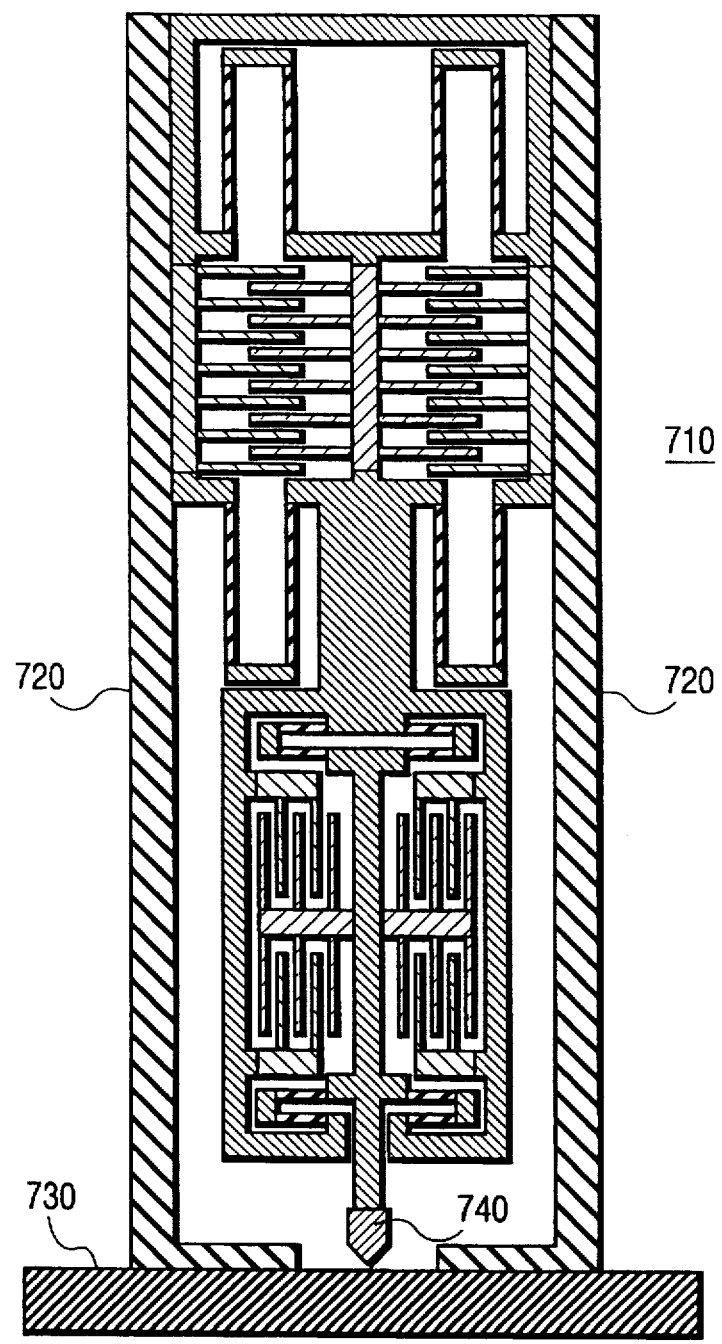
FIG. 20 is a schematic drawing showing an embodiment of a surface observing apparatus which can be operated manually.

FIG. 20 is a schematic drawing showing an embodiment of a surface observing apparatus which can be operated manually. Also in this embodiment, a probe driving mechanism 710 mainly consisting of the surface observing apparatus shown in FIG. 15 is encircled by peripheral structure 720 which has an opening at the end as shown in FIG. 20 and constituted so that the probe 740 of the probe driving mechanism 710 is opposite to a sample 730 at its opening. The information of irregularities on the surface of the sample can be obtained by touching the surface observing apparatus to the surface of the sample with the distance between the probe 740 suitably moved in the direction of Z by an actuator mechanism and the sample 730 kept suitably. For example, irregularities can be observed with the surface observing apparatus put on the sample and with the surface observing apparatus directed upward for the sample.

In this embodiment, it is inconvenient to operate only one fabricated surface observing apparatus manually because it is small, however, the apparatus itself can be considerably reinforced by integrating a large number of surface observing apparatuses as shown in FIG. 16 to constitute a surface observing apparatus with an appropriate size, the operation for pressing on a sample manually can be simplified and the range of applications of this type of observing apparatus can be widened.

The probe 740 is provided with an actuator mechanism in the directions of X, Y and Z as in the embodiment shown in FIG. 15, approximately one third of 100 μm can be scanned in the direction of X and approximately one second of 10 μm can be scanned in the direction of Y. Therefore, assuming that one irregularity exists per 10 nm on the surface of a sample, the information of $1.6 \times 10^6$ irregularities can be obtained by one surface observing apparatus in this embodiment. As the surface observing apparatus is operated manually in this embodiment, the coarse adjustment 410 shown in FIG. 17 is not required.

Figure 21:
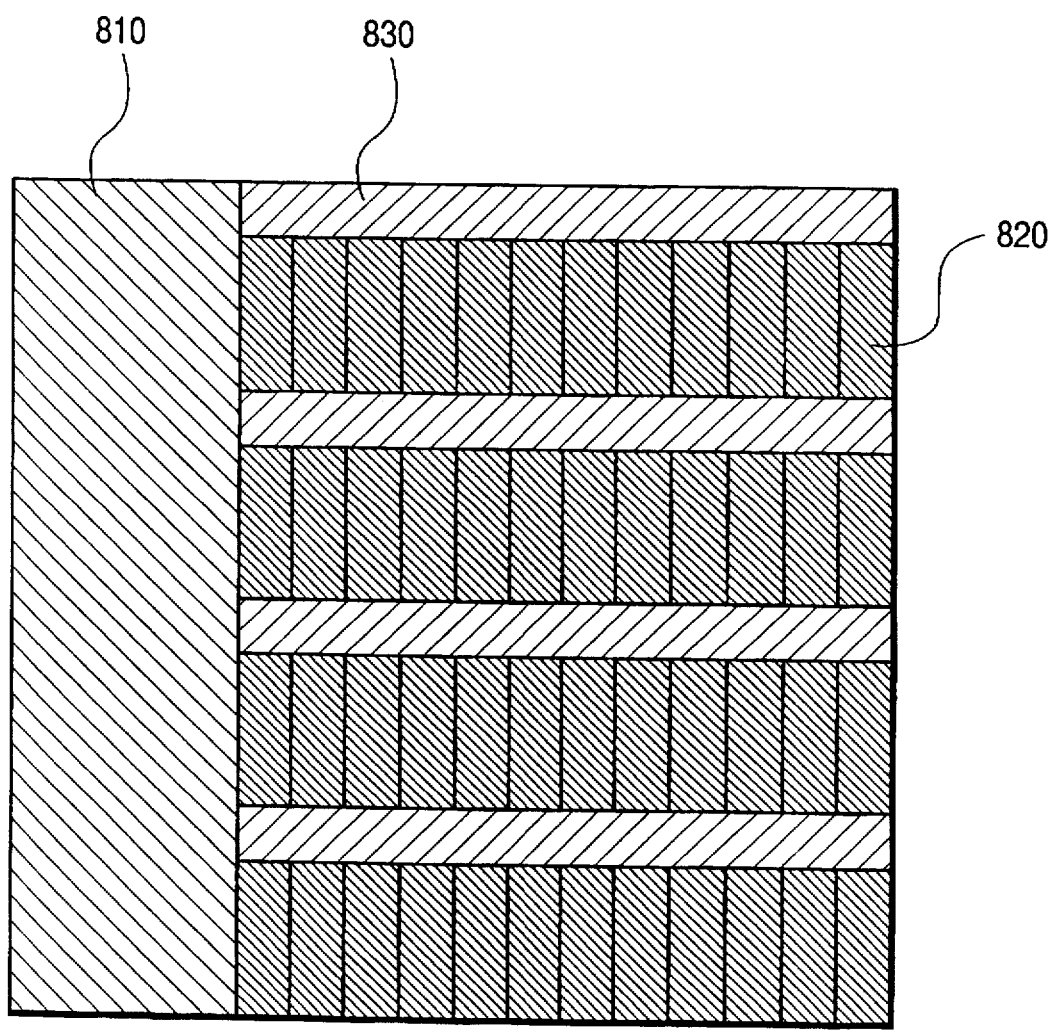
FIG. 21 is a schematic drawing showing another embodiment of the array of each element of a surface observing apparatus which is integrated flatly.

FIG. 21 is a schematic drawing showing another example of the array of each element in the constitution of flatly integrated surface observing apparatuses. FIG. 21 is a plan showing surface observing apparatuses integrated on one substrate, a reference number 820 denotes an individual surface observing apparatus, 830 denotes an integration control unit for an individual surface observing apparatus and 810 denotes an I/O control unit for the entire integrated surface observing apparatuses. Also in this embodiment, each of all the surface observing apparatuses 820 on one substrate is controlled by the surface observing apparatus integration control unit 830 as described referring to FIG. 16 and synthetically, controlled by the I/O control unit 810. The I/O control unit 810 can be also provided with a buffer function that it transmits an I/O instruction from an external device to the surface observing apparatus integration control unit 830, temporarily stores the information of irregularities on the surface of a sample observed by an individual surface observing apparatus 820 and outputs the information to an external device.

The surface observing apparatus equivalent to this embodiment is different from the constitution shown in FIG. 16 and surface observing apparatuses 820 are arranged on one substrate in parallel two-dimensionally. Therefore, a probe is required to be formed with it directed upward in the space of FIG. 21 and bent in the position of the probe of each observing apparatus 820. That is, according to this embodiment, a surface observing apparatus wherein surface observing apparatuses 820 are arranged on one substrate two-dimensionally can be realized. However, in the meantime, as the area which can cover by the motion of an actuator mechanism in the directions of X and Y in the space of FIG. 21 of each apparatus is relatively smaller than the area occupied by each apparatus, compared with the area in the embodiment shown in FIG. 16, the range covered by a coarse adjustment (though it is not shown, it is provided on the rear face in the drawing as in FIG. 17) is required to be increased.

FIGS. 22 and 23 show embodiments in which the constitution of a surface observing apparatus is applied to an electron beam source. These embodiments can be developed to one of means for executing, for example electron beam lithography by controlling a large number of apparatuses arranged two-dimensionally by an external device as in the embodiment shown in FIG. 16. Both are substantially provided with the same constitution, however, the embodiment shown in FIG. 22 premises the constitution of a surface observing apparatus and an electrode for a focusing lens are separate, while the embodiment shown in FIG. 23 is different from the embodiment shown in FIG. 22 in that the constitution of a surface observing apparatus and an electrode for a focusing lens are integrated.

A surface observing apparatus 910 in FIGS. 22(a) and 23(a) is provided with the same constitution as in FIG. 15. A field emission electron emitted from the probe 940 of the apparatus 910 or a tunneling electron can be used as an electron beam source as it is and an emitted electron is focused on the surface of a sample 930 by an electrode 950 for a focusing lens. FIGS. 22(b) and 23(b) are sectional views respectively showing the electrode 950 for a focusing lens viewed along a position A–B in which the electrode 950 for a focusing lens is arranged in the direction shown by an arrow. As in FIG. 22(b) the electrode 950 for a focusing lens is provided at the end of a coupling 920, the electrode 950 can be provided in a position in which the ends of the couplings 920 encircle the probe. As in FIG. 23(b) the electrode 950 for a focusing lens is provided at the end of a Z-direction driving shaft 960, the electrode 950 can be provided in a position in which the ends of the Z-direction driving shafts 960 encircle the probe 940. Though the ends of the couplings 920 encircle the probe as if they wrapped it from outside, the electrode 950 is not influenced by it. The coupling 920 in these two embodiments is equivalent to the coupling 360 in the embodiment shown in FIG. 16.

To cover the entire surface of a sample, a coarse adjustment is naturally required also in this embodiment. FIGS. 22(a) and 23(a) are sectional views viewed from a position C–D in the direction shown by an arrow in FIGS. 22(b) and 23(b).

FIGS. 24 and 25 show other embodiments in which the constitution of a surface observing apparatus is applied to an electron beam source and are also the same as FIGS. 22 and 23 in that these embodiments can be developed to one of means for executing, for example electron beam lithography by controlling a large number of apparatuses arranged two-dimensionally by an external device. However, these embodiments are different from the embodiments shown in FIGS. 22 and 23 in that in this embodiment, surface observing apparatuses are arranged on one substrate two-dimensionally as in the embodiment shown in FIG. 21. Therefore, a probe for emitting an electron is required to be directed upward in the space of the drawing.

Figure 24A:
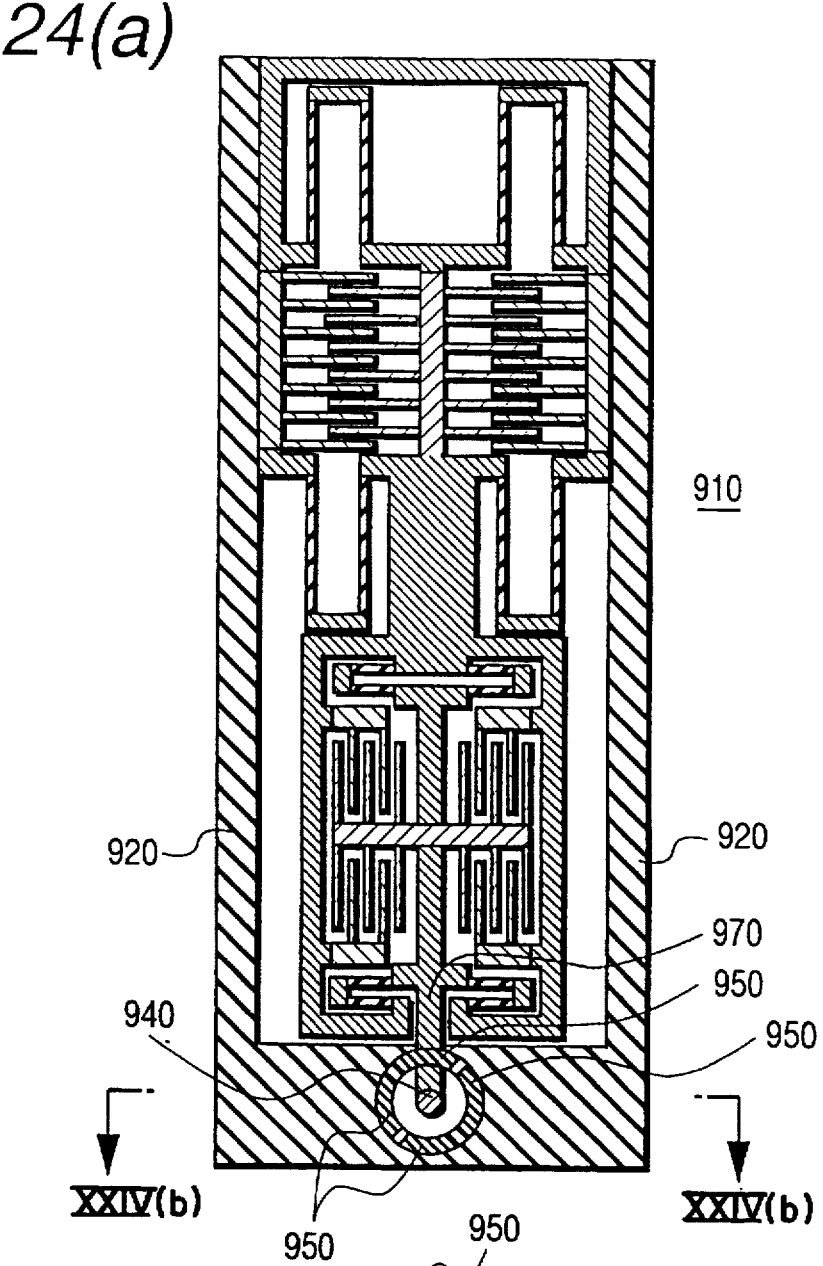
FIG. 24(a) is a plan and FIG. 24(b) is a sectional view viewed along a line A–B in FIG. 24(a)
Figure 24B:
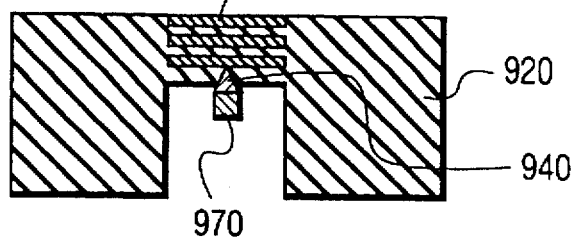
Figure 25A:
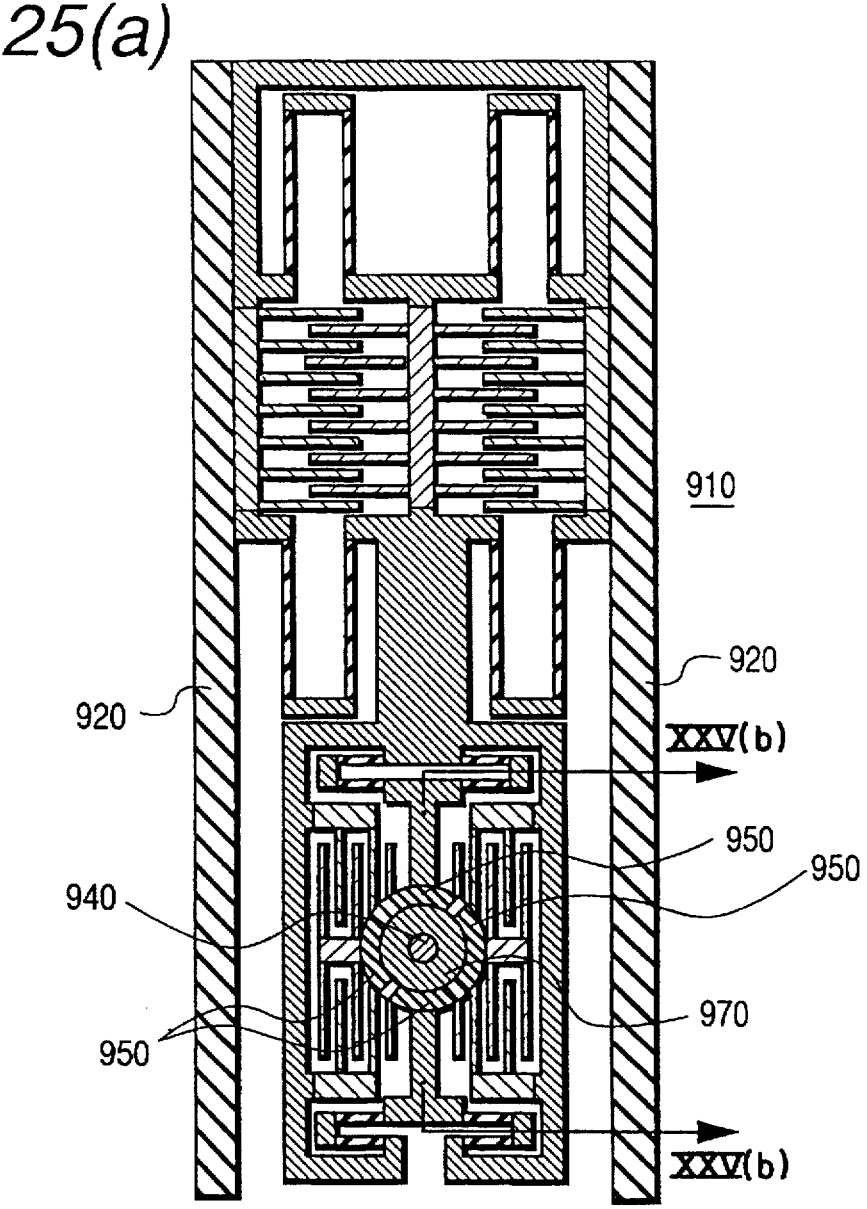
FIG. 25(a) is a plan and FIG. 25(b) is a sectional view viewed along a line A–B in FIG. 25(a).
Figure 25B:
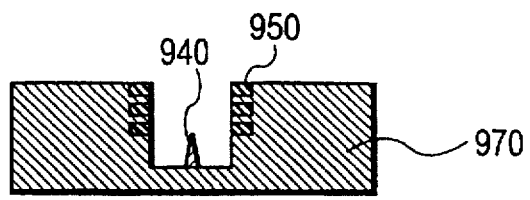

In the embodiments shown in FIGS. 24 and 25, a probe 940 for emitting an electron is formed on supporting structure 970 equivalent to the probe supporting structure 280 (or the movable electrode 2500) in the surface observing apparatus shown in FIG. 15 as shown in FIGS. 24(a) and 25(a). An electrode 950 for a focusing lens is formed in a left portion in the center of the supporting structure 970 as if electrodes for a focusing lens wrapped the probe 940 as shown in FIGS. 24(b) and 25(b) which respectively show the section viewed along a position A–B in the direction shown by an arrow in FIGS. 24(a) and 25(a).

Also in the embodiment shown in FIG. 24, the electrode 950 for a focusing lens is formed on a coupling 920 equivalent to the coupling 360 in FIG. 16, while the embodiment shown in FIG. 25 is different from the embodiment shown in FIG. 24 in that in the embodiment shown in FIG. 25, the probe 940 is formed in the supporting structure 970 equivalent to the probe supporting structure 280 (or the movable electrode 2500) of the surface observing apparatus shown in FIG. 15.

In these two embodiments, to cover the entire surface of a sample as in the embodiment shown in FIG. 21, a coarse adjustment which can cover a wider area than in the embodiments shown in FIGS. 22 and 23 is required. FIGS. 24(a) and 25(a) are plans of FIGS. 24(b) and 25(b).

According to the present invention, a microminiaturized efficient electromechanical transducer by an integrated electrostatic actuator can be realized. Further, a microminiaturized integrated micro-fabricated device can be realized and can be developed to a scanning probe microscope and an information recording device using the scanning probe microscope or an electron beam exposure device.

We claim:

1. An electromechanical transducer comprising an actuator a plurality of which are arranged and the relative amount of movement of which is controlled by controlling electrostatic force operating between its opposite fixed portion and movable portion;
   wherein the electrode of said fixed portion or said movable portion is constituted by a dielectric; and
   wherein the electrode of said movable portion or said fixed portion consists of a pair of positive and negative electrodes formed so that said dielectric electrode is substantially put between them.

2. An electromechanical transducer provided with a plurality of electrostatic actuators formed on one substrate;
   wherein said two actuators are cascade-connected so that the fixed electrode of one actuator is linked to the movable electrode of the other actuator; and
   wherein one of said two actuators can drive said movable electrode in the directions of perpendicular two axes.

3. An electromechanical transducer according to claim 2, wherein a plurality of substrates on each of which a plurality of electrostatic actuators are formed are laminated.

4. An integrated micro-fabricated device, comprising:
   a plurality of integrated electrostatic actuators formed on one substrate;
   wherein said two actuators are cascade-connected so that the fixed electrode of one actuator is linked to the movable electrode of the other actuator;
   wherein one of said two actuators can drive said movable electrode in the directions of perpendicular two axes; and
   wherein the probe of a probe microscope is formed at the free end of said movable electrode of said actuator provided with a free movable electrode.

5. An integrated micro-fabricated device according to claim 4, wherein a plurality of substrates on each of which an integrated micro-fabricated device provided with a plurality of integrated electrostatic actuators formed on one substrate by semiconductor micro-fabrication technology is formed are laminated.

6. An integrated micro-fabricated device according to claim 5, wherein a coarse adjustment which can be moved wider for said plural laminated substrates than the movable range of the movable electrode of said integrated electrostatic actuator is added.

7. An integrated micro-fabricated device according to claim 4, wherein a precise movable which can be moved wider on the surface of a sample arranged opposite to said probe than the movable range of the movable electrode of said integrated electrostatic actuator is added.

8. An integrated micro-fabricated device provided with a plurality of electrostatic actuators formed on one substrate by semiconductor micro-fabrication technology;
   wherein each of said actuators consists of two actuators;
   wherein said two actuators are cascade-connected so that the fixed electrode of one actuator is formed on the movable electrode of the other actuator;
   wherein one of said two actuators can drive the movable electrode in the directions of perpendicular two axes;
   wherein the probe of a probe microscope is formed at the free end of the movable electrode of one of said cascade-connected two actuators; and
   wherein said probe is protruded in the direction perpendicular to the surface of said substrate.

9. An integrated micro-fabricated device provided with a plurality of electrostatic actuators formed on one substrate by semiconductor micro-fabrication technology;
   wherein each of said actuators consists of two actuators;
   wherein said two actuators are cascade-connected so that the fixed electrode of one actuator is formed on the movable electrode of the other actuator;
   wherein one of said two actuators can drive the movable electrode in the directions of perpendicular two axes;
   wherein the probe of a probe microscope is formed at the free end of the movable electrode of one of said cascaded-connected two actuators; and
   wherein an information recorder opposite to said probe which holds the proper positional relationship between it and the base of said actuator is provided.

10. An integrated micro-fabricated device according to claim 9, wherein a plurality of substrates on each of which a plurality of electrostatic actuators are formed are laminated.

11. An integrated micro-fabricated device according to claim 9, wherein the relative positional relationship between said information recorder and the base of said actuator can be changed without substantially changing the distance between them.

12. An integrated micro-fabricated device according to claim 10, wherein the relative positional relationship between said information recorder and the base of said actuator can be changed without substantially changing the distance between them.

13. An integrated micro-fabricated device according to claim 9, wherein said probe is protruded in the direction perpendicular to the surface of said substrate.

14. An integrated micro-fabricated device provided with a plurality of electrostatic actuators formed on one substrate by semiconductor micro-fabrication technology;
wherein each of said actuator consists of two actuators;
wherein said two actuators are cascade-connected so that the fixed electrode of one actuator is formed on the movable electrode of the other actuator;
wherein one of said two actuators can drive the movable electrode in the directions of perpendicular two axes;
wherein the probe of a probe microscope is formed at the free end of the movable electrode of one of said cascade-connected two actuators; and
wherein an electrode for generating an electric field operating on an electron emitted from said probe is arranged in a position opposite to said probe and with the proper positional relationship with the base of said actuator.

15. An integrated micro-fabricated device according to claim 14, wherein said electrode is moved integrally with said probe.

16. An integrated micro-fabricated device according to claim 15, wherein said probe is protruded in the direction perpendicular to the surface of said substrate.

17. An integrated micro-fabricated device according to claim 14, wherein said probe is protruded in the direction perpendicular to the surface of said substrate.

18. An electromechanical transducer comprising:
a substrate;
a first electrostatic actuator formed on the substrate; and
a second electrostatic actuator formed on the substrate;
wherein the first electrostatic actuator includes
a pair of a plurality of first comb electrodes which are fabricated and fixed on the substrate,
a pair of movable second comb electrodes combined to a first stem at the edge thereof, each free part of which is inserted between each comb electrode of the first comb electrodes,
a first spring part connected between the base part of the first comb electrodes and one edge of the first stem, and
a second spring part connected between the base part of the first comb electrodes and the other edge of the first stem;
wherein the electromechanical transducer further comprises a connecting stem, one edge of which is combined to the first stem and the other free edge of which extends outside an area of the first comb electrodes;
wherein the second electrostatic actuator includes
a pair of a plurality of third comb electrodes which are supported by the free edge of the connecting stem at the one edge thereof,
a pair of fourth comb electrodes combined to a second stem at the edge thereof, each free part of which is inserted between each comb electrode of the third comb electrodes,
a third spring part connected between the base part of the third comb electrodes and one edge of the second stem, and
a fourth spring part connected between the base part of the third comb electrodes and the other edge of the second stem;

wherein the electromechanical transducer further comprises:
a probe part, one edge of which is connected to the second stem; and
electric leads for providing a suitable electric potential to the electrodes; and
wherein the first stem and the second stem are drivable in directions of two different axes relative to each other on the substrate.

19. An electromechanical transducer according to claim 18, wherein the other free edge of the probe part connected to the second stem extends outside an area of the third comb electrodes.

20. An electromechanical transducer according to claim 19, wherein a peripheral structure encircles the electromechanical transducer; and
wherein a portion of the peripheral structure opposing the probe part can be used as a recording medium by cooperation with the probe part.

21. An electromechanical transducer according to claim 19, wherein a peripheral structure encircles the electromechanical transducer; and
wherein a portion of the peripheral structure opposing the probe part has an opening through which the probe part extends to a position substantially even with an outer surface of the peripheral structure so that the electromechanical transducer can be attached manually to a surface of a sample to be observed by the probe part.

22. An electromechanical transducer according to claim 19, wherein a peripheral structure encircles the electromechanical transducer;
wherein a portion of the peripheral structure opposing the probe part has an opening through which the probe part does not extend; and
wherein electrodes are provided on the peripheral structure around the opening for extracting and focusing electrons from the probe part so that the electromechanical transducer can be used as an electron source.

23. An electromechanical transducer according to claim 19, wherein the free edge of the probe part vertically extends outside an area of the surface of the third comb electrodes;
wherein a peripheral structure encircles the electromechanical transducer;
wherein a portion of the peripheral structure opposing the probe part has an opening through which the probe part does not extend; and
wherein electrodes are provided on the peripheral structure around the opening for extracting and focusing electrons from the probe part so that the electromechanical transducer can be used as an electron source.

24. An electromechanical transducer assembly comprising:
a substrate; and
a plurality of electromechanical transducers formed in parallel on the substrate;
wherein each of the electromechanical transducers includes
a first electrostatic actuator formed on the substrate, and
a second electrostatic actuator formed on the substrate;
wherein the first electrostatic actuator includes
a pair of a plurality of first comb electrodes which are fabricated and fixed on the substrate,
a pair of movable second comb electrodes combined to a first stem at the edge thereof, each free part of which is inserted between each comb electrode of the first comb electrodes, a first spring part connected between the base part of the first comb electrodes and one edge of the first stem, and a second spring part connected between the base part of the first comb electrodes and the other edge of the first stem;

wherein each of the electromechanical transducers further includes a connecting stem, one edge of which is combined to the first stem and the other free edge of which extends outside an area of the first comb electrodes;

wherein the second electrostatic actuator includes a pair of a plurality of third comb electrodes which are supported by the free edge of the connecting stem at the one edge thereof, a pair of fourth comb electrodes combined to a second stem at the edge thereof, each free part of which is inserted between each comb electrode of the third comb electrodes, a third spring part connected between the base part of the third comb electrodes and one edge of the second stem, and a fourth spring part connected between the base part of the third comb electrodes and the other edge of the second stem;

wherein each of the electromechanical transducers further includes a probe part, one edge of which is connected to the second stem, and electric leads for providing a suitable electric potential to the electrodes; and wherein the first stem and the second stem are drivable in directions of two different axes relative to each other on the substrate.

25. An electromechanical transducer assembly according to claim 24, wherein the other free edge of the probe part connected to the second stem extends outside an area of the third comb electrodes.

26. An electromechanical transducer assembly apparatus comprising a plurality of electromechanical transducer assemblies according to claim 24;

wherein the other free edge of the probe part connected to the second stem extends outside an area of the third comb electrodes.

27. An electromechanical transducer assembly apparatus according to claim 26, wherein the substrates of the plurality of electromechanical transducer assemblies are shifted relative to each other in a direction of an axis of movement of the probe part by a portion of the width of the substrate substantially equal to a range of movement of the probe part in the direction of the axis.

28. A electromechanical transducer assembly comprising:

a substrate; and a plurality of electromechanical transducers formed on the substrate;

wherein each of the electromechanical transducers includes a first electrostatic actuator formed on the substrate, and a second electrostatic actuator formed on the substrate;

wherein the first electrostatic actuator includes a pair of a plurality of first comb electrodes which are fabricated and fixed on the substrate, a pair of movable second comb electrodes combined to a first stem at the edge thereof, each free part of which is inserted between each comb electrode of the first comb electrodes, a first spring part connected between the base part of the first comb electrodes and one edge of the first stem, and a second spring part connected between the base part of the first comb electrodes and the other edge of the first stem;

wherein each of the electromechanical transducers further includes a connecting stem, one edge of which is combined to the first stem and the other free edge of which extends outside an the area of the first comb electrodes;

wherein the second electrostatic actuator includes a pair of a plurality of third comb electrodes which are supported by the free edge of the connecting stem at the one edge thereof, a pair of fourth comb electrodes combined to a second stem at the edge thereof, each free part of which is inserted between each comb electrode of the third comb electrodes, a third spring part connected between the base part of the third comb electrodes and one edge of the second stem, and a fourth spring part connected between the base part of the third comb electrodes and the other edge of the second stem;

wherein each of the electromechanical transducers further includes a probe part, one edge of which is connected to the second stem and the other free edge of which extends outside an area of the third comb electrodes, and electric leads for providing a suitable electric potential to the electrodes;

wherein the first stem and the second stem are drivable in directions of two different axes relative to each other on the substrate; and wherein the electromechanical transducer assembly further comprises a coarse adjustment on which the electromechanical transducers are placed so that positions of the probes of the electromechanical transducers can be coarsely controlled along one of the axes.

29. An electromechanical transducer assembly apparatus comprising:

a substrate; and a plurality of electromechanical transducer assemblies formed in parallel on the substrate;

wherein each of the electromechanical transducer assemblies includes a plurality of electromechanical transducers formed in parallel on the substrate;

wherein each of the electromechanical transducers includes a first electrostatic actuator formed on the substrate, and a second electrostatic actuator formed on the substrate;

wherein the first electrostatic actuator includes a pair of a plurality of first comb electrodes which are fabricated and fixed on the substrate, a pair of movable second comb electrodes combined to a first stem at the edge thereof, each free part of which is inserted between each comb electrode of the first comb electrodes, a first spring part connected between the base part of the first comb electrodes and one edge of the first stem, and a second spring part connected between the base part of the first comb electrodes and the other edge of the first stem;

wherein each of the electromechanical transducers further includes a connecting stem, one edge of which is combined to the first stem and the other free edge of which extends outside an area of the first comb electrodes;

wherein the second electrostatic actuator includes a pair of a plurality of third comb electrodes which are supported by the free edge of the connecting stem at the one edge thereof, a pair of fourth comb electrodes combined to a second stem at the edge thereof, each free part of which is inserted between each comb electrode of the third comb electrodes, a third spring part connected between the base part of the third comb electrodes and one edge of the second stem, and a fourth spring part connected between the base part of the third comb electrodes and the other edge of the second stem;

wherein each of the electromechanical transducers further includes a probe part, one edge of which is connected to the second stem and the other free edge of which vertically extends outside an area of the surface of the third comb electrodes, and electric leads for providing a suitable electric potential to the electrodes;

wherein the first stem and the second stem are drivable in directions of two different axes relative to each other on the substrate;

wherein each of the electromechanical transducer assemblies further includes an integration control units provided on the substrate; and wherein the electromechanical transducer assembly apparatus further comprises an I/O control unit provided on the substrate for controlling the integration control units of the electromechanical transducer assemblies.

30. An electromechanical transducer comprising:

a substrate;

a first electrostatic actuator formed on the substrate; and a second electrostatic actuator formed on the substrate;

wherein the first electrostatic actuator includes a pair of a plurality of first comb electrodes which are fabricated and fixed on the substrate, a pair of movable second comb electrodes combined to a first stem at the edge thereof, each free part of which is inserted between each comb electrode of the first comb electrodes, a first spring part connected between the base part of the first comb electrodes and one edge of the first stem, and a second spring part connected between the base part of the first comb electrodes and the other edge of the first stem;

wherein the electromechanical transducer assembly further comprises a connecting stem, one edge of which is combined to the first stem and the other free edge of which extends outside an area of the first comb electrodes;

wherein the second electrostatic actuator includes a pair of a plurality of third comb electrodes which are supported by the free edge of the connecting stem at the one edge thereof, a pair of fourth comb electrodes combined to a second stem at the edge thereof, each free part of which is inserted between each comb electrode of the third comb electrodes, a third spring part connected between the base part of the third comb electrodes and one edge of the second stem, and a fourth spring part connected between the base part of the third comb electrodes and the other edge of the second stem;

wherein the electromechanical transducer further comprises:

a probe part, one edge of which is connected to the second stem and the other free edge of which vertically extends outside an area of the surface of the third comb electrodes; and electric leads for providing a suitable electric potential to the electrodes; and wherein the first stem and the second stem are drivable in directions of two different axes relative to each other on the substrate.

31. An electromechanical transducer comprising:

a substrate;

a first electrostatic actuator formed on the substrate; and a second electrostatic actuator formed on the substrate:

wherein the first electrostatic actuator includes a pair of a plurality of first comb electrodes which are fabricated and fixed on the substrate, a pair of movable second comb electrodes combined to a first stem at the edge thereof, each free part of which is inserted between each comb electrode of the first comb electrodes, a first spring part connected between the base part of the first comb electrodes and one edge of the first stem, and a second spring part connected between the base part of the first comb electrodes and the other edge of the first stem;

wherein the electromechanical transducer further comprises a connecting stem, one edge of which is combined to the first stem and the other free edge of which extends outside an the area of the first comb electrodes;

wherein the second electrostatic actuator includes a pair of a plurality of third comb electrodes which are supported by the free edge of the connecting stem at the one edge thereof, a pair of fourth comb electrodes combined to a second stem at the edge thereof, each free part of which is inserted between each comb electrode of the third comb electrodes, a third spring part connected between the base part of the third comb electrodes and one edge of the second stem, and a fourth spring part connected between the base part of the third comb electrodes and the other edge of the second stem;

wherein the electromechanical transducer further comprises:

a probe part, one edge of which is connected to the second stem and the other free edge of which extends outside an area of the third comb electrodes; and electric leads for providing a suitable electric potential to the electrodes;

wherein the first stem and the second stem are drivable in directions of two different axes relative to each other on the substrate;

wherein a portion of the base part of the third comb electrodes opposing the probe part has an opening through which the probe part does not extend; and wherein electrodes are provided on the base part of the third comb electrodes around the opening for extracting and focusing electrons from the probe part so that the electromechanical transducer can be used as an electron source.

32. An electromechanical transducer according to claim 31, wherein the free edge of the probe part vertically extends outside an area of the surface of the third comb electrodes.

* * * * *